United States Patent
Huang et al.

(10) Patent No.: US 8,935,163 B2
(45) Date of Patent: Jan. 13, 2015

(54) AUTOMATIC CONVERSATION SYSTEM AND CONVERSATION SCENARIO EDITING DEVICE

(75) Inventors: Shengyang Huang, Tokyo (JP); Hiroshi Katukura, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 774 days.

(21) Appl. No.: 12/542,311

(22) Filed: Aug. 17, 2009

(65) Prior Publication Data

US 2010/0049513 A1  Feb. 25, 2010

(30) Foreign Application Priority Data

Aug. 20, 2008  (JP) ............................ P2008-212191

(51) Int. Cl.
  *G10L 15/00*  (2013.01)
  *G10L 15/22*  (2006.01)
(52) U.S. Cl.
  CPC ...................................... *G10L 15/22* (2013.01)
  USPC ............ 704/231; 704/235; 704/251; 704/270
(58) Field of Classification Search
  USPC .................................. 704/231, 235, 251, 270
  See application file for complete search history.

(56) References Cited

U.S. PATENT DOCUMENTS

| | | | |
|---|---|---|---|
| 6,266,642 B1* | 7/2001 | Franz et al. .................... | 704/277 |
| 7,949,532 B2* | 5/2011 | Huang et al. .................. | 704/270 |
| 2002/0138274 A1* | 9/2002 | Sharma et al. ................. | 704/270 |
| 2003/0182113 A1* | 9/2003 | Huang ............................ | 704/231 |
| 2005/0033582 A1* | 2/2005 | Gadd et al. ..................... | 704/277 |
| 2005/0080628 A1 | 4/2005 | Kuperstein | |
| 2006/0111909 A1* | 5/2006 | Maes et al. ..................... | 704/270 |
| 2007/0094005 A1 | 4/2007 | Huang et al. | |

FOREIGN PATENT DOCUMENTS

| CN | 1975858 | 6/2007 |
|---|---|---|
| JP | 2002-366190 | 12/2002 |

OTHER PUBLICATIONS

The State Intellectual Property Office of P.R. China, Office action of 2009101670565, Mar. 12, 2012.
Chinese Patent Office, Office Action of CN Patent Application No. 200910167056.5, Jul. 23, 2012.

(Continued)

*Primary Examiner* — Qi Han
(74) *Attorney, Agent, or Firm* — Lexyoume IP Meister, PLLC

(57) ABSTRACT

A conversation scenario editor generates/edits a conversation scenario for an automatic conversation system. The system includes a conversation device and a conversation server. The conversation device generates an input sentence through speech recognition of an utterance by a user. The conversation server determines the reply sentence based on the conversation scenario when a reply sentence to the input sentence is requested from the conversation device. The editor includes a language model generator for generating a language model to be used for the speech recognition based on the conversation scenario. According to the editor, a non-expert can generate the language model to provide an adequate conversation based on the speech recognition.

14 Claims, 39 Drawing Sheets

(56) References Cited

OTHER PUBLICATIONS

The State Intellectual Property Office of P.R.Cihna, The Notification of the Third Office Action of the corresponding Chinese Application No. 200910167056.5 (Dec. 31, 2012).

Huang Mir-Lie Zhu Xiao-Yan, "A Finite State Automata Approach Based on Slot-Feature for Dialogue Management in Spoken Dialogue System," CHINFBE Journal of Computers, vol. 27 No. 8 (Aug. 2004).

\* cited by examiner

X1 (⟨OTHER⟩ | ⟨timer⟩) X2
X1 (YES, I DO.) X3
X1 (NO, I DON'T.) X4

X1 ( ⟨OTHER⟩ | ⟨timer⟩ ) X2
X1 (NO, I DON'T.) X3 ( ⟨OTHER⟩ | ⟨timer⟩ ) X2

X1 (⟨OTHER⟩ | ⟨timer⟩) X1
X1 (I LIKE IT.) X2
X1 (I DON'T LIKE IT.) X3

FIG. 14

X1 (TRIP SOUNDS GOOD.) X5
X1 (⟨OTHER⟩ | ⟨timer⟩) X2 (⟨OTHER⟩ | ⟨timer⟩) X3 (⟨OTHER⟩ | ⟨timer⟩) X4 (⟨OTHER⟩ | ⟨timer⟩) X1
X1 (TRIP SOUNDS GOOD.) X5
X1 (⟨OTHER⟩ | ⟨timer⟩) X2 (⟨OTHER⟩ | ⟨timer⟩) X3 (TRIP SOUNDS GOOD.) X5
. . .

FIG. 16

```
X1 (⟨OTHER⟩ | ⟨timer⟩) X2
X1 (GIVE ME A CLUE.) X3 (IT'S XX.) X4 (⟨OTHER⟩ | ⟨timer⟩) X2
X1 (IT'S XX.) X4 (⟨OTHER⟩ | ⟨timer⟩) X2
X1 (GIVE ME A CLUE.) X3 (⟨OTHER⟩ | ⟨timer⟩) X2
```

FIG. 27

| | UTTERED SENTENCE TYPE | DATA (SENTENCE) EXAMPLE |
|---|---|---|
| DA | DECLARATIVE AFFIRMATIVE SENTENCE | I LIKE SATO. |
| LA | LOCATIONAL AFFIRMATIVE SENTENCE | I LIKE SATO'S SERIOUS FACE WHEN HE IS AT BAT. |
| NA | NEGATIONAL AFFIRMATIVE SENTENCE | I DO NOT WANT TO TALK WITH ANYONE WHO DISLIKES SATO. |
| DQ | DECLARATIVE INTERROGATIVE SENTENCE | DO YOU LIKE SATO? |
| LQ | LOCATIONAL INTERROGATIVE SENTENCE | HOW DO YOU LIKE SATO AT BAT? |
| NQ | NEGATIONAL INTERROGATIVE SENTENCE | IT IS NOT TRUE YOU LIKE SATO, IS IT? |
| ... | ... | ... |

FIG. 28

| DETERMINATION TYPE | USED DICTIONARY |
|---|---|
| DETERMINATION D | DEFINITION EXPRESSION DICTIONARY |
| DETERMINATION N | NEGATIONAL EXPRESSION DICTIONARY |
| ⋮ | ⋮ |

FIG. 31

| | TOPIC TITLE (SECOND MORPHEME INFORMATION) | | |
|---|---|---|---|
| | 1001<br>FIRST SPECIFICATION INFORMATION | 1002<br>SECOND SPECIFICATION INFORMATION | 1003<br>THIRD SPECIFICATION INFORMATION |
| 810D₁ TOPIC SPECIFICATION INFORMATION (= [SEVEN SAMURAI]) | SEVEN SAMURAI | * 8201 | * 8202 |
| | SEVEN SAMURAI | * | INTERESTING |
| | ... | ... | ... |
| 810D₂ TOPIC SPECIFICATION INFORMATION (= [RAN]) | RAN | * 8203 | * 8204 |
| | RAN | * | INTERESTING |
| | ... | ... | ... |
| 810D₃ TOPIC SPECIFICATION INFORMATION (= [YOJIMBO]) | YOJIMBO | * 8205 | * 8206 |
| | YOJIMBO | * | INTERESTING |
| | ... | ... | ... |

FIG. 32

| TYPE | CONTENTS |
|---|---|
| D | DECLARATIVE SENTENCE |
| T | DECLARATIVE SENTENCE INCLUDING TIMELIKE NOTION SUCH AS "WHEN" |
| L | DECLARATIVE SENTENCE INCLUDING LOCATIONAL NOTION SUCH AS "WHERE" |
| N | SENTENCE NEGATING DECLARATIVE SENTENCE |
| ⋮ | ⋮ |

FIG. 33

810 — TOPIC SPECIFICATION INFORMATION (= "SATO")
SUPERORDINATE CONCEPT TOPIC SPECIFICATION INFORMATION (= "SANDLOT BASEBALL")
SUBORDINATE CONCEPT TOPIC SPECIFICATION INFORMATION (= "HOME RUN")
SYNONYM (= "PANDA SATO", "PLAYER SATO", "PANDA")

| | | 830 CONTENTS | 840 NEXT-PLAN DESIGNATION INFORMATION |
|---|---|---|---|
| 820 { TOPIC TITLE 1-1 (SATO; *; LIKE) | REPLY SENTENCE 1-1 | RESPONSE TYPE | | |
| | | DA | "I LIKE SATO, TOO." | ID [0000010] |
| | | TA | "I LIKE SATO AT BAT" | ID [0000011] |
| | | ... | ... | ... |
| TOPIC TITLE 1-2 | REPLY SENTENCE 1-2 | ... | ... | ... |
| ... | | | | |

US 8,935,163 B2

AUTOMATIC CONVERSATION SYSTEM AND CONVERSATION SCENARIO EDITING DEVICE

CROSS-REFERENCE TO RELATED APPLICATION

This application is based upon the prior Japanese Patent Application No. 2008-212191, filed on Aug. 20, 2008, the entire contents of which are incorporated herein by reference.

BACKGROUND OF THE INVENTION

1. Field of the Invention

The present invention relates to an automatic conversation system and a conversation scenario editing device, and particularly to an automatic conversation system that is capable of automatically outputting a reply in response to an utterance by a user to establish a conversation with the user, and a conversation scenario editing device that generates and edits a conversation scenario to be used in the automatic conversation system.

2. Related Background of the Invention

Conventionally, an automatic conversation device has been proposed which receives a user's utterance and then outputs a reply to the utterance (Japanese Patent Application Laid-Open No. 2002-366190: Patent Document 1). It is generally done in such a conventional automatic conversation device that a database that stores pairs of user's utterances and replies thereto is searched to output a reply to a user's utterance.

However, according to the above conventional method by which a reply to a user's utterance will be output based on a one-on-one relationship, it is difficult by an automatic conversation device to establish a natural conversation about a certain topic with a user and to provide a preliminarily prepared story content (e.g., explanations of an institution fabric, emergency medical treatments) to a user step by step.

It has been proposed as a technology for establishing a natural conversation to use a scenario that provides conversation contents along with progress of a preliminarily prepared conversation while replying to user's utterances. However, it was impossible to create a language model from the scenario without a Knowledge Base engineer with expertise. In most cases, since the conversation engine is integrated with Knowledge Base, even a KB creator cannot comprehend an entire "scenario".

It is an object of the present invention to provide an automatic conversation system and a conversation scenario editing device that enable a non-expert without expertise to generate a language model based on a scenario that provides, replying to user's utterances, conversation contents along with progress of a preliminarily prepared conversation to provide a more adequate conversation based on a precise speech recognition.

SUMMARY OF THE INVENTION

A first aspect of the present invention provides a conversation scenario editing device for an automatic conversation system using a conversation scenario. The automatic conversation system includes a conversation device and a conversation server. The conversation device generates an input sentence through speech recognition of an utterance by a user and requests the conversation server to send a reply sentence to the input sentence. The conversation server determines the reply sentence based on the conversation scenario when being requested to send the determined reply sentence to the conversation device for an output of the reply sentence to the user. The editing device includes a language model generator for generating, based on the conversation scenario, a language model to be used when the conversation device executes the speech recognition.

According to the conversation scenario editing device, it is possible to generate a language model based on a scenario that provides, replying to user's utterances, conversation contents along with progress of a preliminarily prepared conversation to provide a more adequate conversation based on a precise speech recognition.

It is preferable that the conversation scenario includes an object and a morphism, and the conversation scenario editing device further comprises an editor for generating the conversation scenario in which the input sentence is the morphism and the reply sentence is the object that corresponds to the morphism. According to this configuration, even an ordinary person (e.g., an end user) can freely create the conversation scenario composed of a "framework of an object(s) and a morphism(s)" and thereby a more adequate conversation based on precise speech recognition can be provided. According to this configuration, the entire "conversation scenario" can be easily grasped. According to a conventional automatic conversation device, only a Knowledge Base engineer who already got expert knowledge about a conversation engine for executing a conversation based on a Knowledge Base can create a conversation scenario.

In addition, the first aspect of the present invention achieves the following advantages. (1) Expression of the scenario is clear because the conversation scenario can be created by concatenating "an object (a reply sentence) and a morphism (an input sentence)". (2) Citation source information with regard to an object (information with regard to a source object cited by the object) is available because an object citation function has been developed. (3) State transition relations of objects can be listed using transition destinations and citation sources with respect to the objects. (4) Basic property of the "object and morphism" can be expressed by a "reply sequence" in which objects and morphisms are aligned. (5) A "reply sequence" is a kind of a "script" and thus a "reply sequence is very clear information" from the viewpoint of general scripting. (6) The conversation scenario editing device, the conversation server, and the conversation device as a whole can "operate the conversation device in accordance with the script".

Note that the conversation scenario editing device is not limited to what described above, even if it can handle a "conversation scenario including objects and morphisms".

It is preferable that the conversation scenario editing devise further comprises a dynamic knowledge generator for generating, from the conversation scenario, dynamic knowledge so as to search the object that corresponds to the morphism. According to this configuration, it is possible to search the morphism (equivalent to the input sentence) and the object (equivalent to the reply sentence) that corresponds to the morphism faster and thereby the reply sentence can be output quickly.

Further, the above-mentioned conversation scenario editing device may be configured so that all user's utterances except a predefined user's utterance(s) can be described as a single morphism. According to this, it is possible to define a reply sentence that can cover an infinite of user's utterances.

A second aspect of the present invention provides an automatic conversation system that includes a conversation device that generates an input sentence through speech recognition of an utterance by a user and requests a conversation server to send a reply sentence to the input sentence, the conversation server that determines the reply sentence based on a conversation scenario when being requested to send the determined reply sentence to the conversation device for an output of the reply sentence to the user, and a conversation scenario editing device that includes a language model generator for generating, based on the conversation scenario, a language model to be used when the conversation device executes the speech recognition.

According to the automatic conversation system, it is possible to generate a language model based on a scenario that provides, replying to user's utterances (input sentences), conversation contents along with progress of a preliminarily prepared conversation to provide a more adequate conversation based on a precise speech recognition.

It is preferable that the conversation scenario includes an object and a morphism, and the conversation scenario editing device further comprises an editor for generating the conversation scenario in which the input sentence is the morphism and the reply sentence is the object that corresponds to the morphism. According to this configuration, even an ordinary person (e.g., an end user) can freely create the conversation scenario composed of a "framework of an object(s) and a morphism(s)" and thereby a more adequate conversation based on precise speech recognition can be provided. According to this configuration, the entire "conversation scenario" can be easily grasped.

It is preferable that the conversation scenario editing devise further comprises a dynamic knowledge generator for generating, from the conversation scenario, dynamic knowledge so as to search the object that corresponds to the morphism. According to this configuration, it is possible to search the morphism (equivalent to the input sentence) and the object (equivalent to the reply sentence) that corresponds to the morphism faster and thereby the reply sentence can be output quickly.

In addition, the above-mentioned conversation scenario editing device may be configured so that all user's utterances except a predefined user's utterance(s) can be described as a single morphism. According to this, it is possible to define a reply sentence that can cover an infinite of user's utterances.

Further, it is preferable that the conversation server sends, to the conversation device, operation control information in which an operation to be executed by the conversation device is described, and the conversation device executes the operation based on the operation control information along with the output of the reply sentence. According to this, a creator of the conversation scenario can control, in addition to contents of the reply sentences, any operations executable by the conversation device via the conversation scenario.

Furthermore, it is preferable that the conversation device is a terminal device (e.g., a robot) that is controlled based on the operation control information. According to this, a creator of the conversation scenario can utilize the conversation scenario as an operation control program to control an operation(s) of the terminal device via the conversation scenario.

BRIEF DESCRIPTION OF THE DRAWINGS

FIG. 14 is an example showing the conversation scenario in FIG. 13 as data;

FIG. 16 is an example showing the conversation scenario in FIG. 15 as data;

FIG. 27 is a table showing uttered sentence types, two-alphabet codes representing the uttered sentence types, and uttered sentence examples corresponding to the uttered sentence types;

FIG. 28 is a diagram showing details of dictionaries stored in an utterance type database;

FIG. 31 is a diagram showing data configuration examples of topic titles (also referred as "second morpheme information");

FIG. 32 is a diagram showing types of reply sentences associated with the topic titles formed in the conversation database;

FIG. 33 is a diagram showing contents of the topic titles, the reply sentences and next plan designation information associated with the topic identification information;

DESCRIPTION OF THE PREFERRED EMBODIMENTS

An embodiment of the present invention will be described hereinafter with reference to the drawings.

The embodiment will be described as an automatic conversation system 1 that outputs a reply against a user's utterance based on a preliminarily prepared conversation scenario 40 and a conversation scenario editing device 30 that generates or edits a conversation scenario 40.

[1. Configuration Example of Automatic Conversation System and Conversation Scenario Editing Device]

Figure 1:
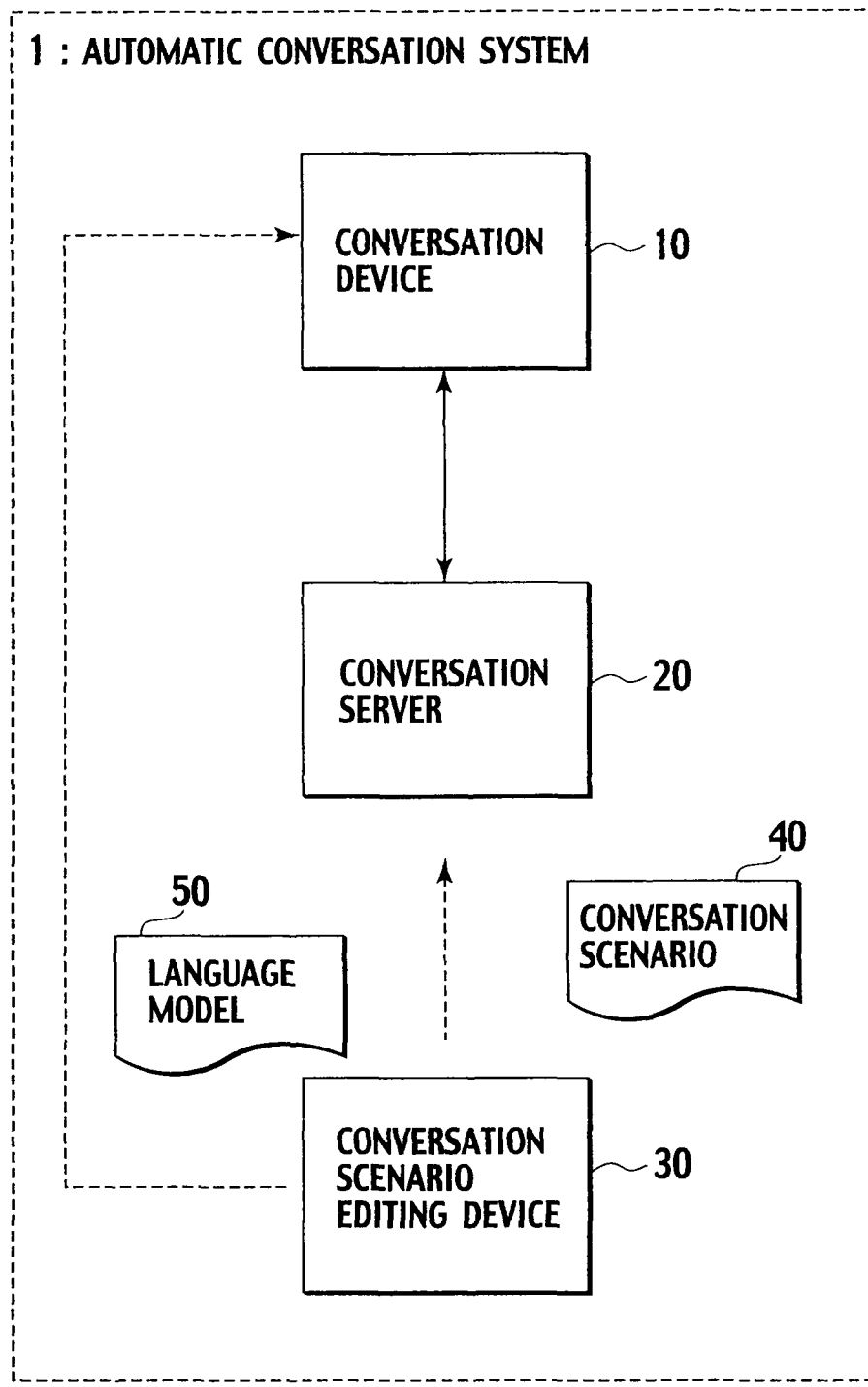
FIG. 1 is a block diagram of an automatic conversation system according to an embodiment of the present invention.

A configuration example of an automatic conversation system 1 and a conversation scenario editing device 30 will be described hereinafter. FIG. 1 is a block diagram showing a configuration example of the automatic conversation system 1. The automatic conversation system 1 includes a conversation device 10, a conversation server 20 connected with the conversation device 10, and the conversation scenario editing device 30 that generates or edits a conversation scenario 40 to be used by the conversation server 20.

When an utterance is input by a user, the conversation device 10 transmits contents of the utterance to the conversation server 20. Upon receiving the utterance contents, the conversation server 20 determines a reply to the utterance contents and operation control information based on a conversation scenario 40. In the operation control information, an operation(s) corresponding to the reply to be executed by the conversation device 10 is defined. Then the conversation server 20 outputs the reply and the operation control information to the conversation device 10.

The conversation scenario editing device 30 generates and edits a conversation scenario 40 and then outputs the generated/edited conversation scenario 40. The output conversation scenario 40 is stored in the conversation server 20. In addition, the conversation scenario editing device 30 generates a language model 50 based on the generated conversation scenario 40. The language model 50 is used by the conversation device 10 for speech recognition.

Each of the above-mentioned devices will be described herein after.

[1.1. Conversation Device]

The conversation device 10 functions to (i) acquire an utterance by a user (user's utterance) as an input, (ii) transmit contents of the input (hereinafter, it is referred to as the input sentence) to the conversation server 20, (iii) receive the reply and the operation control information sent back from the conversation server 20, and (iv) execute an operation(s) based on the received content according to the output of the reply and the operation control information.

The conversation device 10 is an information processor including a central processing unit (CPU), a main memory (RAM), a read only memory (ROM), an input/output unit (I/O), and, if necessary, an external storage device such as a hard disk drive. Alternatively, the conversation device 10 may be a device or a toy that includes such an information processor. For example, the conversation device 10 may be a computer, a cellular phone, a so-called Internet appliance, a robot or the like. Programs are stored in the ROM or the hard disk drive of the conversation device 10. The programs are loaded on the main memory and executed by the CPU, so that the conversation device 10 operates. Alternatively, the programs may not necessarily be stored in a storage device within the information processor but may be provided from an external device (e.g., a server of an application service provider) and loaded on the main memory.

Figure 2A:
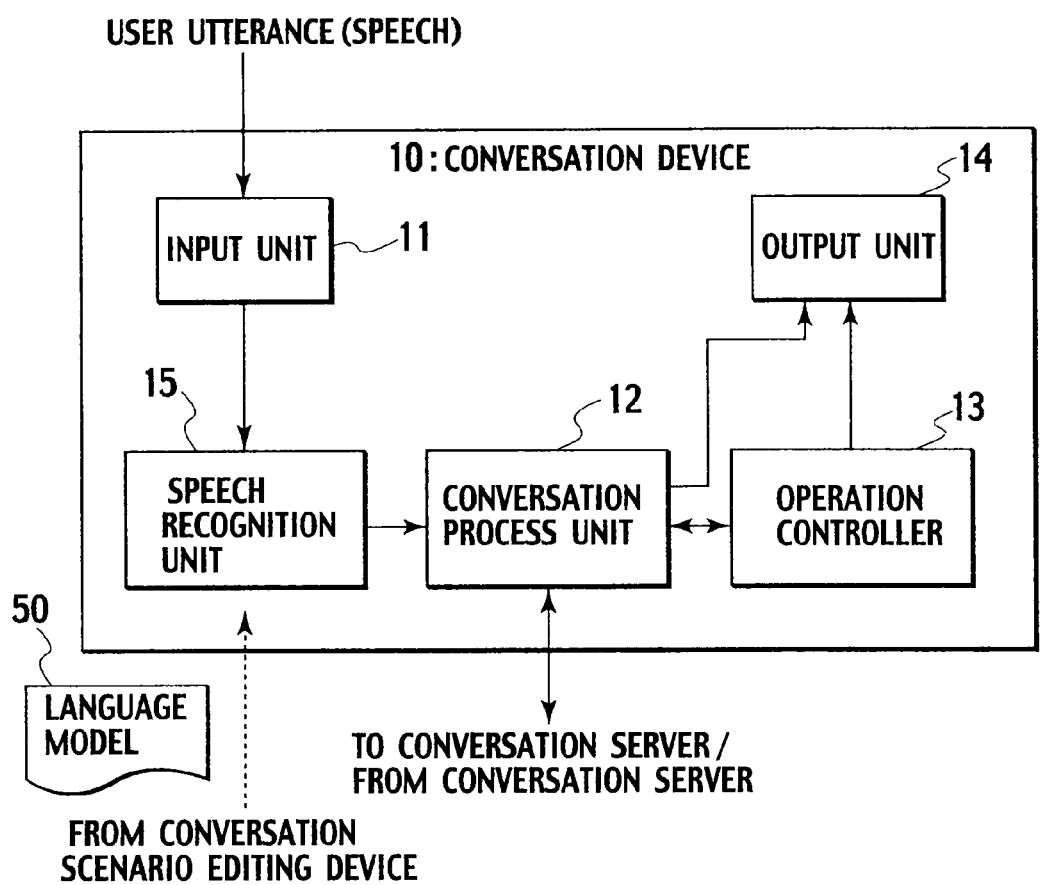
FIG. 2A is a block diagram of a conversation device shown in FIG. 1.

FIG. 2A is a block diagram showing a configuration example of the conversation device 10. The conversation device 10 includes an input unit 11, a speech recognition unit 15 connected with the input unit 11, a conversation process unit 12 connected with the speech recognition unit 15, an operation controller 13 connected with the conversation process unit 12, and an output unit 14 connected with the conversation process unit 12 and the operation controller 13. In addition, the conversation process unit 12 can communicate with the conversation server 20. Further, the speech recognition unit 15 receives the language model 50 generated by the conversation scenario editing device 30 and converts audio signals into the input sentence based on the language model 50.

The input unit 11 functions to receive contents of the user's utterance and converts them into electrical signals (the audio signals) or the like that can be processed by the conversation process unit 12. For example, the input unit 11 is a microphone.

Figure 2B:
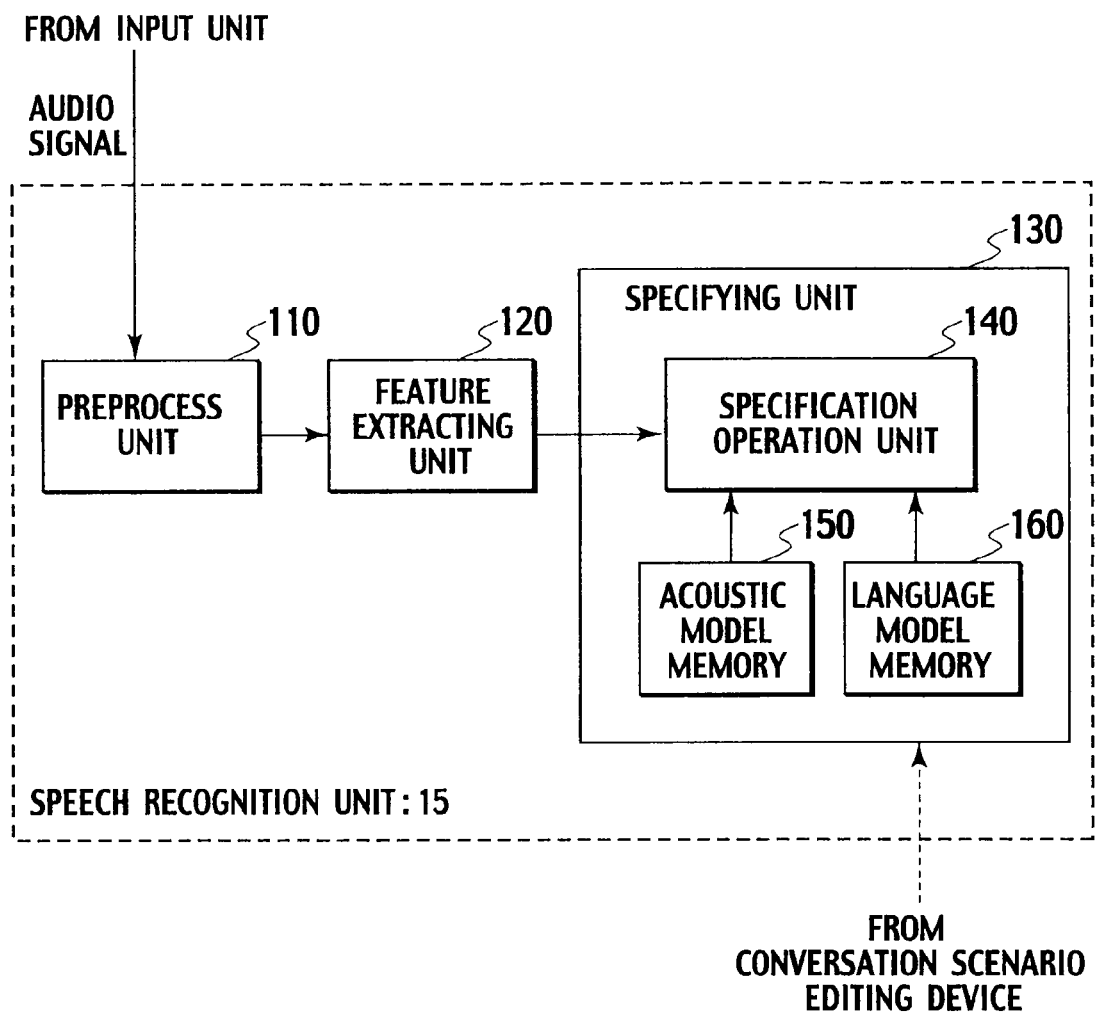
FIG. 2B is a block diagram showing a speech recognition unit shown in FIG. 2A.

The speech recognition unit 15 functions to estimate the contents of the user's utterance based on the signal received from the input unit 11 and output the estimated result of the contents of the user's utterance as the input sentence. FIG. 2B is a block diagram showing a configuration example of the speech recognition unit 15. The speech recognition unit 15 includes a preprocess unit 110 that receives the audio signal, a feature extracting unit 120 connected with the preprocess unit 110, and a specifying unit 130 connected with the feature extracting unit 120.

The specifying unit 130 further includes a specification operation unit 140, an acoustic model memory 150 connected with the specification operation unit 140, and a language model memory 160 connected with the specification operation unit 140. The specification operation unit 140 is connected with the feature extracting unit 120 and also connected with the conversation control unit 20. In addition, the content stored in the language model memory 160 is rewritten by the output from a language model generating unit 35 described later in detail.

The preprocess unit 110 converts analog signals of the user's utterance into digital signals and then executes a noise reduction process for removing noises to facilitate feature-extraction to generate the audio signals.

The feature extracting unit 120 receives the audio signals output from the preprocess unit 110 and acquiring information from the analog signals for determining which class a pattern belongs to. Here, a "pattern" is information such as sounds or images in the real world and a "class" is a pre-defined concept to which a pattern is allocated. For example, an audio signal generated by pronouncing [a] is a pattern and the audio signal belongs to a class indicated by a symbol [a].

The feature extracting unit 120 calculates feature quantity indicating the feature of the audio signal from the digital signal (the audio signal). A variety of techniques have been proposed about how to calculate the feature quantity. For example, the feature quantity is calculated by converting a voice signal into a spectrum to extract its format as a feature vector. Alternatively, the feature extracting unit 120 may be configured to calculate the feature quantity as a feature vector with a method called as MFCC (Mel-Frequency Cepstrum Coefficient). Other methods may be employed.

The specifying unit 130 functions to determine which class the feature vector output from the feature extracting unit 120 belongs to. The specifying unit 130 preliminarily prepares a prototype vector that represents each class and calculates which prototype vector the input feature vector approximates to determine a class corresponding to the feature vector.

Describing the configuration of the specifying unit 130 in more detail, the specifying unit 130 includes the specification operation unit 140, the acoustic model memory 150 connected with the specification operation unit 140 and the language model memory 160 connected with the specification operation unit 140.

The acoustic model memory 150 functions to store an acoustic model(s). The acoustic model is a probability model for acquiring a conditional probability indicating a probability for an observation of a feature vector sequence $X_1, X_2, \ldots, X_n$ under a condition where a word string $w_1, w_2, \ldots, w_n$ is uttered.

The language model memory 160 functions to store a language model(s). The language model is a probability model for acquiring an occurrence probability $P(w_1, w_2, \ldots, w_n)$ of a word string $w_1, w_2, \ldots, w_n$.

With respect to the probability model, a concatenation probability of words is calculated to acquire the occurrence probability of a word string, by counting the number of times a word $w_{k-1}$ and the number of times a word string $w_{k-1}, w_k$ each appears in a corpus (a large and structured set of texts used in linguistics: e.g., electronic data of a newspaper article collection: The conversation scenario 40 is included therein in the present embodiment.) and then dividing the number of times a word string $w_{k-1}, w_k$ by the number of times a word $w_{k-1}$.

The specification operation unit 140 functions to calculate, using the acoustic model and the language model, the product of the probability P1 for an observation of a feature vector sequence $X_1, X_2, \ldots, X_n$ under a condition where a word string $w_1, w_2, \ldots, w_n$ is uttered and an occurrence probability P2 of a word string $w_1, w_2, \ldots, w_n$, to search a word string $w_1, W_2, \ldots, w_n$ that maximizes the product.

The specification operation unit 140 outputs the word string acquired as the result of the search to the conversation process unit 12 as the input sentence.

Explanations of the specifying unit 130 and the speech recognition unit 15 have thus been completed.

Descriptions of the configuration example of the conversation device 10 will be continued with referring back to FIG. 2A.

The conversation process unit 12 sends the input sentence received from the speech recognition unit 15 to the conversation server 20 and requests the conversation server 20 to transmit a reply sentence corresponding to the input sentence and operation control information corresponding to the reply sentence. Upon receiving the reply sentence and the operation control information corresponding to the reply sentence from the conversation server 20, the conversation process unit 12 sends the reply sentence to the output unit 14 which in turn outputs the reply sentence. The conversation process unit 12 also sends the operation control information to the operation controller 13.

The operation controller 13 executes an operation(s) specified in the operation control information sent from the conversation process unit 12. If the specified operation is a presentation by the output unit 14 (e.g., displaying or sound-outputting of the specified operation), the operation controller 13 causes the output unit 14 to execute the presentation. In a case where the specified operation is to output a different reply sentence from the reply sentence acquired from the conversation server 20 (for example, the reply sentence acquired from the conversation server 20 is "What shall we talk about?" and the different reply sentence to be output is "Please say something!"), the different reply sentence is output by the output unit 14.

The output unit 14 functions to output the reply sentence in a recognizable manner by a user. It is not limited how to output the reply sentence. For example, the output unit 14 may be a terminal device such as an LCD device to provide the reply sentence as text information to a user, an artificial voice generator or a speaker to provide the reply sentence as voice (sound) information to a user. Note that the output unit 14 may be a robot that can display images/texts on a display provided thereon, can illuminate illuminants provided thereon, can output voices/sounds via a speaker provided thereon, or can move its arms and so on. Such operations are controlled by the operation controller 13 based on the operation control information.

[1.2. Conversation Server]

The conversation server 20 functions to determining a reply that is an answer to the utterance contents and operation control information corresponding to the reply based on the conversation scenario 40 to output them to the conversation device 10. In the operation control information, an operation (s) to be executed by the conversation device 10 is described.

The conversation server 20 is an information processor including a central process unit (CPU), a main memory (RAM), a read only memory (ROM), an input/output unit (I/O), and, if necessary, an external storage device such as a hard disk drive. For example, the conversation server 20 may be a computer, a workstation, a server or the like. Programs are stored in the ROM or the hard disk drive of the conversation server 20. The programs are loaded on the main memory and executed by the CPU, so that the conversation server 20 operates. Alternatively, the programs may not necessarily be stored in a storage device within the information processor but may be provided from an external device (e.g., a server of an application service provider) and loaded on the main memory.

The conversation device 10 and the conversation server 20 may be connected wired or wirelessly or may be connected via a communication network such as a LAN, a wireless LAN, or the Internet (a plurality of communication networks may be combined). The conversation device 10 and the conversation server 20 need not be separated stand-alone devices. The conversation device 10 and the conversation server 20 may be implemented as an integrated single device.

Figure 3:
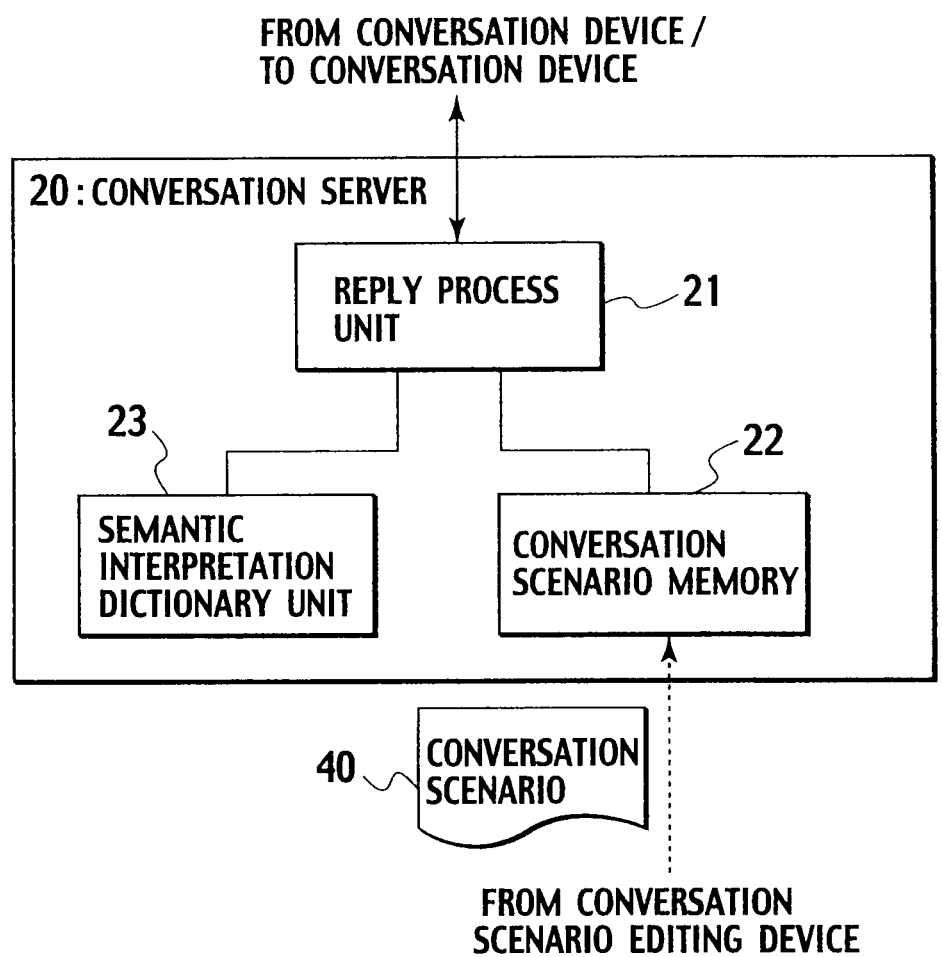
FIG. 3 is a block diagram of a conversation server shown in FIG. 1.

FIG. 3 is a block diagram showing a configuration example of the conversation server 20. The conversation server 20 includes a reply process unit 21 capable of communicating with the conversation device 10, a semantic interpretation dictionary unit 23 connected with the reply process unit 21 and a conversation scenario memory 22 connected with the reply process unit 21.

The reply process unit 21 receives the input sentence from the conversation device 10 and selects/determines a reply sentence to the input sentence based on the conversation scenario 40 stored in the conversation scenario memory 22. The selected/determined reply sentence and operation control information corresponding to the reply sentence are transmitted to the conversation device 10. In addition, the reply process unit 21 acquires a synonym or a synonymous sentence with the input sentence by referring to a semantic interpretation dictionary stored in the semantic interpretation dictionary unit 23 to select/determine the reply sentence based on the synonym or synonymous sentence.

The semantic interpretation dictionary unit 23 functions to store the semantic interpretation dictionary for rephrasing the reply sentence (e.g., to extend the reply sentence using a synonym or the like). The semantic interpretation dictionary is equivalent to a database functioning as a thesaurus or the like.

The conversation scenario memory 22 functions to store the conversation scenario 40 generated or edited by the conversation scenario editing device 30. The conversation scenario 40 will be described later in detail.

[1.3. Conversation Scenario Editing Device]

The conversation scenario editing device 30 functions to generate a new conversation scenario 40 or an edited conversation scenario 40 to be used by the above-mentioned conversation server 20. Note that the conversation scenario 40 is edited by adding a new content (s) to an already-generated conversation scenario 40 or by deleting a part (some parts) from an already-generated conversation scenario 40.

The conversation scenario editing device 30 is an information processor including a central process unit (CPU), a main memory (RAM), a read only memory (ROM), an input and output unit (I/O), and, if necessary, an external storage device such as a hard disk drive. For example, the conversation scenario editing device 30 may be a computer, a workstation or the like. Programs are stored in the ROM or the hard disk drive of the conversation scenario editing device 30. The programs are loaded on the main memory and executed by the CPU, so that the conversation scenario editing device 30 operates. Alternatively, the programs may not necessarily be stored in a storage device within the information processor but may be provided from an external device (e.g., a server of an application service provider) and loaded on the main memory.

Figure 4:
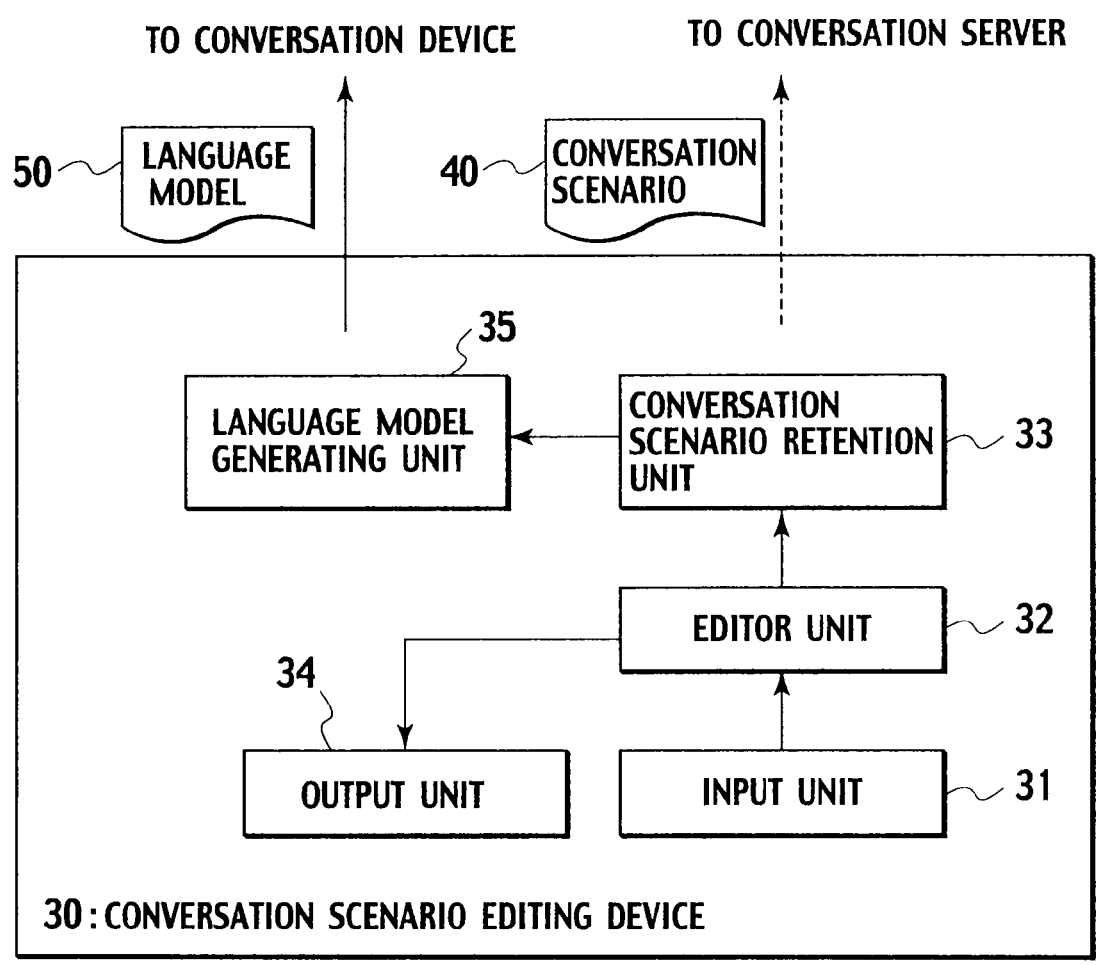
FIG. 4 is a block diagram of a conversation scenario editing device shown in FIG. 1.

FIG. 4 is a block diagram showing a configuration example of the conversation scenario editing device 30. The conversation scenario editing device 30 includes an input unit 31, an editor unit 32 connected with the input unit 31, an output unit 34 connected with the editor unit 32, a conversation scenario retention unit 33 connected with the editor unit 32, and a language model generating unit 35 connected with the conversation scenario retention unit 33.

The input unit 31 functions to receive a user's input and convert it into electrical signals or the like that can be processed by the editor unit 32. For example, the input unit 31 is a keyboard, a pointing device, a touch screen, a microphone, or a combination thereof.

The output unit 34 functions to output being-edited or already-edited contents of the conversation scenario 40 in a recognizable manner by a user (an operator) of the conversation scenario editing device 30. For example, the output unit 34 may be an LCD device or the like.

The editor unit 32 functions to generate/edit (to add, modify or delete) data of the conversation scenario 40 according to contents of the user's input via the input unit 31. Here, the being-edited contents of the conversation scenario 40 are displayed on the output unit 34, so that the operator can recognize the being-edited contents of the conversation scenario 40 in real time. In addition, the editor unit 32 outputs the already-edited data of the conversation scenario 40 to the conversation scenario retention unit 33.

In addition, the editor unit 32 may also have a warning function. According to the warning function, the editor unit 32 checks whether or not an appropriate state transition relation is maintained in the generated conversation scenario 40. If there is a violation in the generated conversation scenario 40, the editor unit 32 generates a message for notifying the presence of the violation and the input sentence or the reply sentence causing the violation to the operator and then display the message on the output unit 34.

Further, the editor unit 32 may further have a semantic interpretation dictionary unit equivalent to that of the semantic interpretation dictionary unit 23 in the conversation server 20. If there is an input sentence or a reply sentence that have redundant/meaningless contents in its conversation scenario 40, the editor unit 32 may functions, using the semantic interpretation dictionary unit, to prompt an operator to rearrange the input sentence or reply sentence in the conversation scenario 40 or to integrate the input sentence or reply sentence into another sentence.

The conversation scenario retention unit 33 functions to store the conversation scenario 40 received from the editor unit 32 in a manner that can be read later. The data of the conversation scenario 40 stored in the conversation scenario retention unit 33 are sent to the conversation scenario memory 22 of the conversation server 20, if necessary or at a predefined time. Transfer of the conversation scenario 40 from the conversation scenario retention unit 33 to the conversation scenario memory 22 may be executed via a storage medium, a communication network or a signal cable.

The language model generating unit 35 functions to calculate the occurrence probability of a word string(s) included in an input sentence (or input and reply sentences) included in the conversation scenario 40 stored in the conversation scenario retention unit 33, and then store the calculated result as the language model 50.

The stored language model 50 is transferred to the speech recognition unit 15 of the conversation device 10, if necessary, or at a predefined time. Transfer of the language model 50 from the language model generating unit 35 to the speech recognition unit 15 may be executed via a storage medium, a communication network or a signal cable.

[1.3.1. About the Conversation Scenario]

The conversation scenario 40 will be described hereinafter. The conversation scenario 40 has the following features.

(1) A reply sentence can be defined as an "object" and a user's utterance (input sentence) can be defined as a "morphism".

According to this feature, a conversation flow defined by the conversation scenario can be expressed by a "state transition diagram". According to the conversation scenario, a reply sentence corresponding to every input sentence (user's utterance) can be output by an "other" function described later. In addition, a user's "silence" (no input) can be addressed by a "timer" utterance described below (no utterance can be treated as a morphism).

Figures 5, 6:
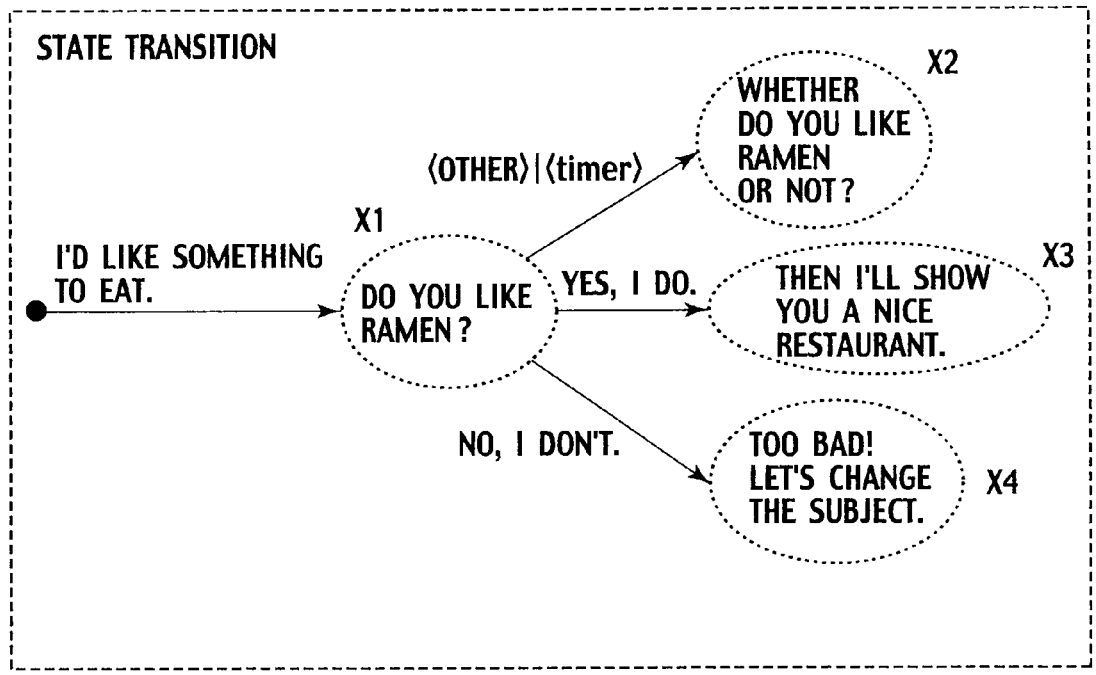
FIG. 5 is state transition diagram showing an example of a conversation scenario corresponding to a discourse scope.
FIG. 6 is an example showing the conversation scenario in FIG. 5 as data.

FIG. 5 is a state transition diagram showing an example of a conversation scenario. In the drawing, oval frames X1, X2, X3, and X4 are reply sentences, respectively. Each reply sentence corresponds to an "objects". Each sentence shown near an arrow is an input sentence. Each input sentence corresponds to a "morphism". An <other> denotes an input sentence other than morphisms from X1 "Yes, I do." and "No, I don't.". A <timer> shows a state where a predefined time period has elapsed without a user's utterance. In addition, the notation "<other>|<timer>" means <other> or <timer>.

In the example shown in FIG. 5, a "morphism" of "I'd like something to eat." transits a state to an "object" of "Do you like ramen?" that is a reply sentence X1. If the first morphism "No, I don't." is generated after an output of the reply sentence X1, the state transits to a reply sentence X4 "Too bad! Let's change the subject." If the second morphism "Yes, I do." is generated after the output of the reply sentence X1, the state transits to a reply sentence X3 "Then I'll show you a nice restaurant." If a morphism other than the first or second morphism is generated or a predefined time period has elapsed without a user's utterance after the output of the reply sentence X1, the state transits to a reply sentence X2 "Whether do you like or not?"

FIG. 6 shows reply sequences in the conversation scenario shown in FIG. 5. Here, the reply sequence "X1 (<OTHER>|<timer>) X2" describes that the reply state of X1 transits to the reply state of X2 due to a morphism other than "Yes, I do." and "No, I don't." or elapsing a predefined time period without a user's utterance.

(2) Morphism composition can be defined.

According to this feature, an utterance that diverges from a main scenario can be accepted and the scenario can return to the main scenario when the utterance was accepted. Therefore, a conversation scenario creator can create an envisaged conversation flow "story" to achieve a conversation along the "story" by the conversation system 1.

Figures 7, 8:
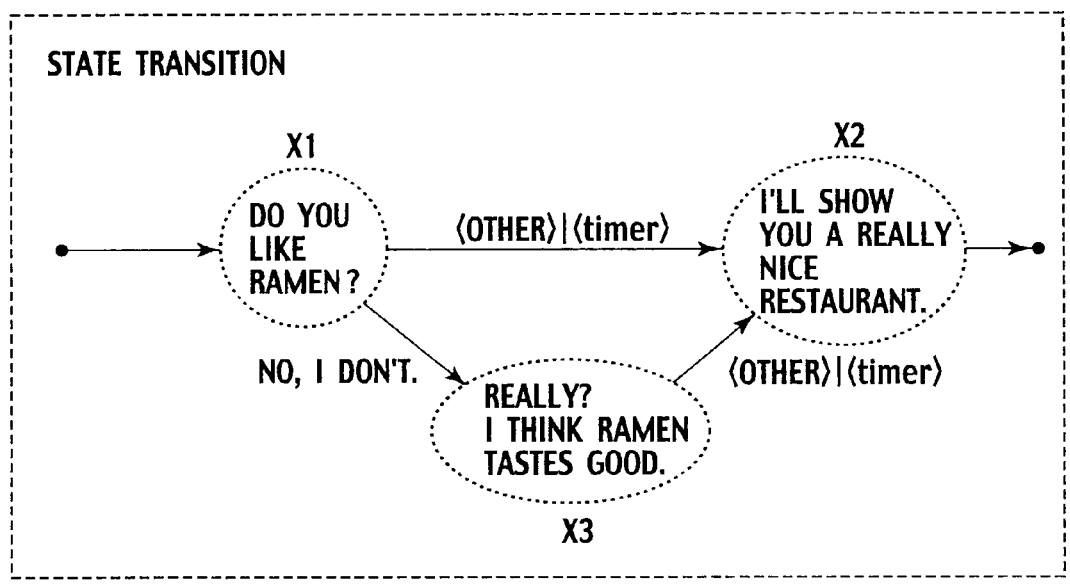
FIG. 7 is state transition diagram showing an example of a conversation scenario including morphism composition.
FIG. 8 is an example showing the conversation scenario in FIG. 7 as data.

FIG. 7 is a state transition diagram showing an example of a conversation scenario including morphism composition. Symbols and notations in the drawing are similar to those in FIG. 5. In this conversation scenario example, if the first morphism "No, I don't." is generated after an output of a reply sentence X1 "Do you like ramen?", a state transits to a reply sentence X3 "Really? I think ramen tastes good." If a morphism other than the first morphism is generated or a predefined time period has elapsed without a user's utterance, the state transits to a reply sentence X2 "I'll show you a really nice restaurant."

Only one morphism <other>|<timer> is defined after an output of the reply sentence X3 "Really? Well, I think ramen tastes good." Therefore, the state transits to the reply sentence X2 "I'll show you a really nice restaurant." when any input sentence (user's utterance) is input or a predefined time period has elapsed.

Since such a conversation scenario example including the above-mentioned morphism composition can be accepted, a user can be led to a tenacious reply sentence while respecting utterances by the user. FIG. 8 shows reply sequences in the conversation scenario shown in FIG. 7. Here, $\underline{X2}$ is a citation of X1 and the citation source of the cited $\underline{X2}$ is X1. It is formally equivalent to a case where a composite morphism "(No, I don't.) X3 (<other>|<timer>)" is defined between objects X1 and X2. This morphism is a composition of a morphism "No, I don't." and a morphism "<other>|<timer>".

(3) An identity element can be defined.

An identity element can be defined in a conversation scenario. An "identity element" is a morphism that does not allow transition of an object. Since an identity element can be defined, the following cases become possible.

Figure 9:
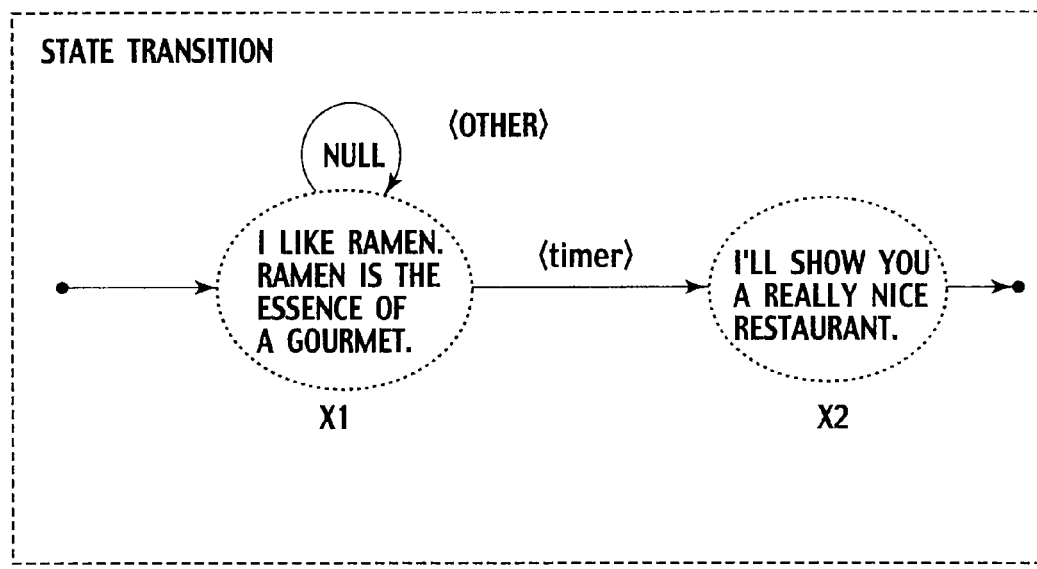
FIG. 9 is a state transition diagram showing an example of a conversation scenario including a forced reply.

(3-a) A "forced reply" can be set for a user's utterance. FIG. 9 is a state transition diagram showing a conversation scenario example including a forced reply. In this example, the first morphism <other> accompanied with NULL is defined for a reply sentence X1 "I like ramen. Ramen is the essence of a gourmet." Therefore, the reply sentence X1 is forcibly output with no regard to any input sentence (user's utterance).

After a predefined time period has elapsed after an output of the reply sentence X1, a state transits to a reply sentence X2 "I'll show you a really nice restaurant." due to a second morphism <timer>.

In this example, disregard of any user's utterance is denoted as "NULL". Here, although NULL is allocated to <other> to disregard any user's utterance, it can be arranged such that only "No, I don't." is to be disregarded.

Figure 10:
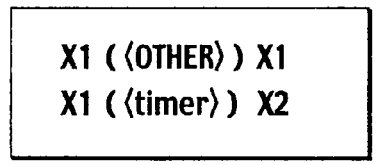
FIG. 10 is an example showing the conversation scenario in FIG. 9 as data.

FIG. 10 shows reply sequences in the conversation scenario shown in FIG. 9. In the reply sequence "X1 (<other>) X1", "(<other>)" is a morphism from X1 to X1, i.e., an identity element.

Figures 11, 12:
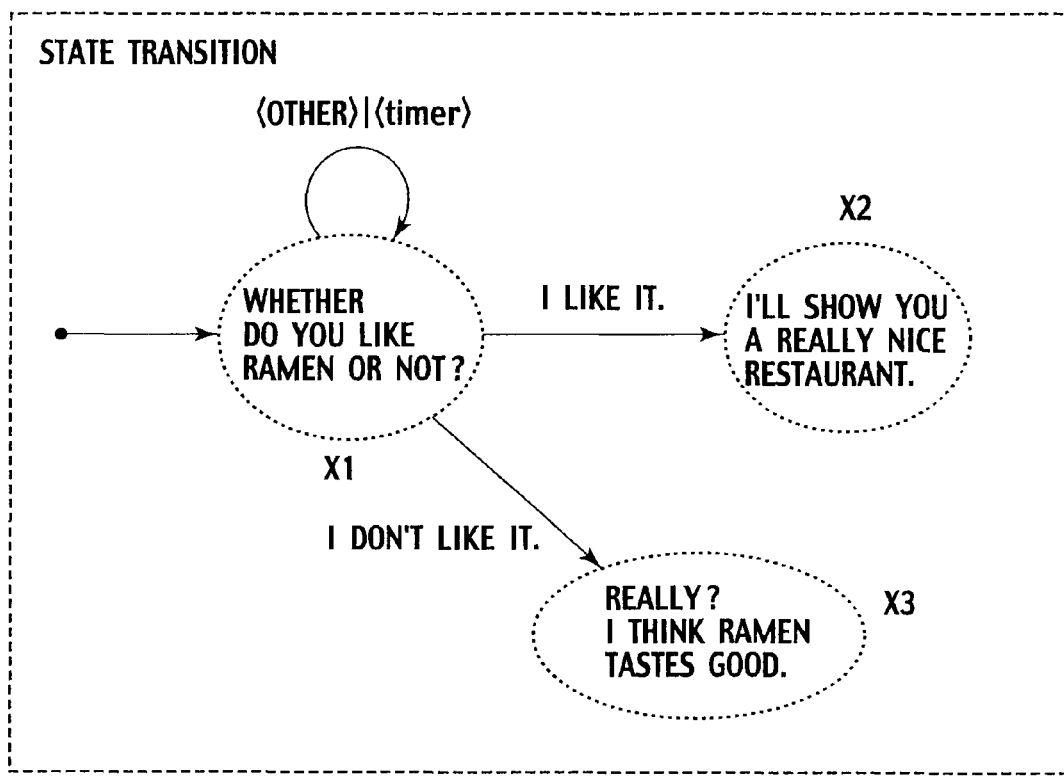
FIG. 11 is a state transition diagram showing an example of a conversation scenario including a tenacious reply.
FIG. 12 is an example showing the conversation scenario in FIG. 11 as data.

(3-b) A "tenacious reply" can be set for a user's utterance. FIG. 11 is a state transition diagram showing an example of a conversation scenario including a "tenacious reply" for a user's utterance. In this example, if the first morphism "I don't like it." is generated after an output of a reply sentence X1 "Whether do you like or not?", a state transits to a reply sentence X3 "Really? I think ramen tastes good." If the second morphism "I like it." is generated after the output of the reply sentence X1, the state transits to a reply sentence X2 "I'll show you a really nice restaurant." If a morphism other than the first or second morphism is generated or a predefined time period has elapsed with no user's utterance, the state returns to the reply sentence X1 again. In this manner, the user can be forced to choose alternatives "I like it." or "I don't like it."

FIG. 12 shows reply sequences in the conversation scenario shown in FIG. 11. Here, $\underline{X1}$ is a citation of X1. The cited $\underline{X1}$ has the same transition destination as its citation source X1. In this sense, $\underline{X1}$ and X1 are isomorphic. The morphism "(<other>|<timer>)" in this case is also referred to as an identity element because it is equivalent to the morphism from X1 to X1.

Figure 13:
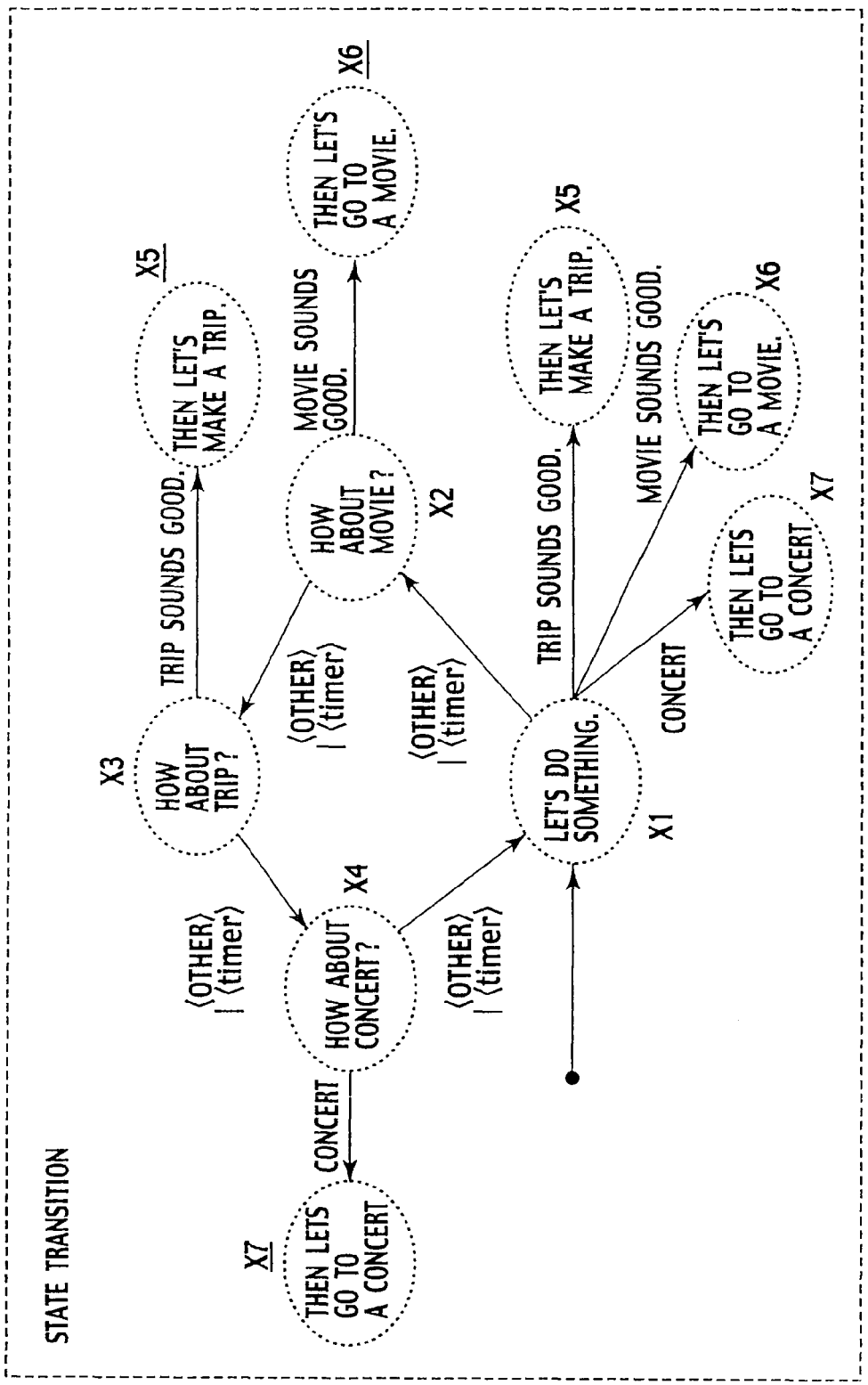
FIG. 13 is a state transition diagram showing an example of a conversation scenario including a closed loop reply.

(3-c) A "closed loop reply" can be created by an "identity element created by composition". According to this feature, it becomes possible to prompt a user's utterance in a closed loop. FIG. 13 is a state transition diagram showing an example of a conversation scenario including a "closed loop reply" created by an "identity element composed by composition". In this example, a closed loop is created by reply sentences X1, X2, X3 and X4. A conversation flow can be controlled by this closed loop. FIG. 14 shows reply sequences in the conversation scenario shown in FIG. 13. Also in this case, a composite morphism "(<other>|<timer>) X2 (<other>|<timer>) X3 (<other>|<timer>) X4 (<other>|<timer>)" is equivalent to a morphism from X1 to X1, i.e., an identity element. The identity element in this case is composed by the "closed loop". Explanations of "(3) An identity element can be defined." have thus been completed.

(4) Associative property holds for morphism composition. According to this feature, two reply sequences S1 and S2 that leads to different paths can be constructive for a reply sequence S corresponding to a certain morphism but the reply sequences S1 and S2 can be treated as being identical. Here, S is defined as a reply sequence S with regard to a certain matter. Then, S1 and S2 are reply sequences each provides different interpretation for S and information on a solution of the matter. Because of having this feature, a conversation scenario according to the present embodiment can cope with user's logical utterances.

Figure 15:
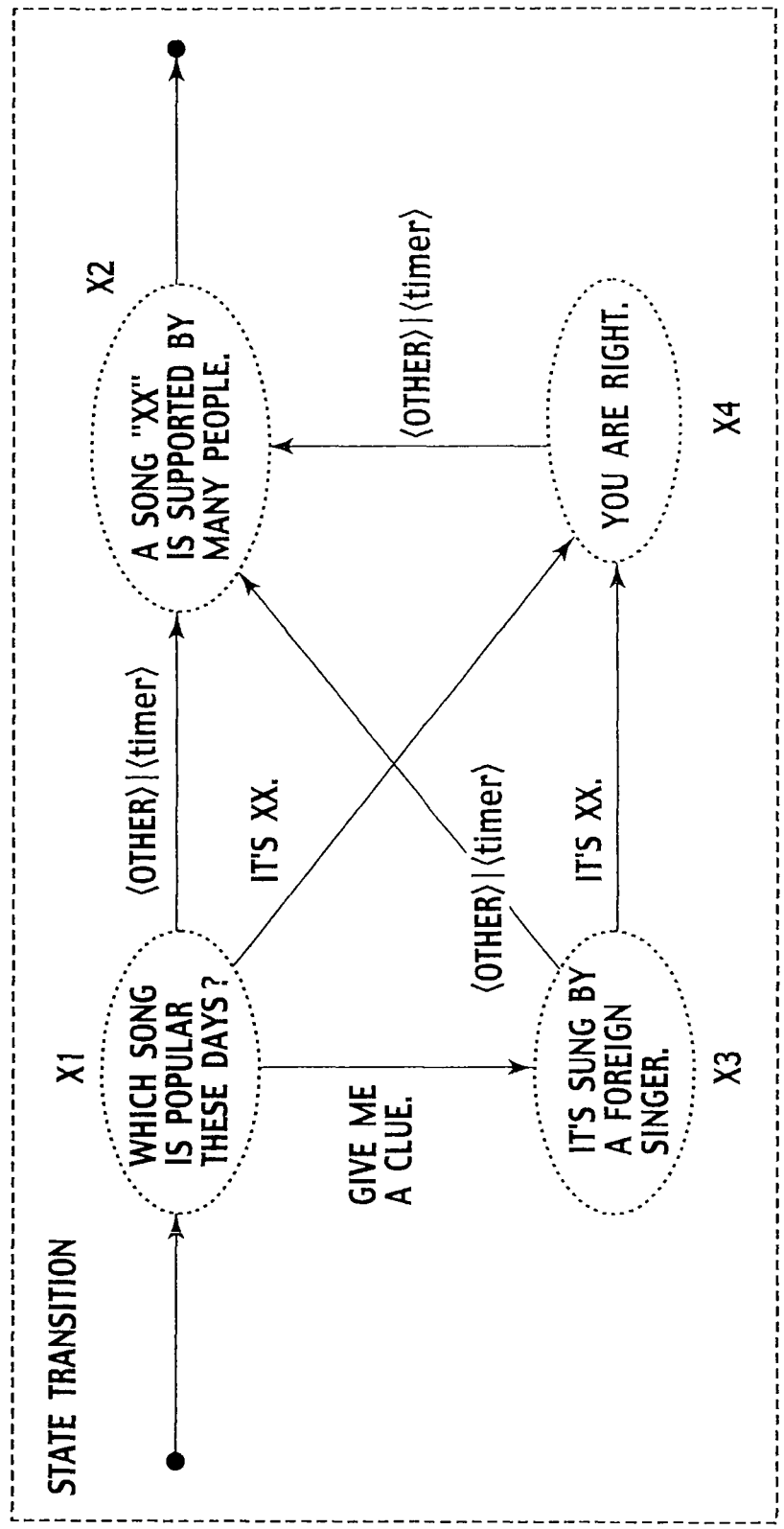
FIG. 15 shows a state transition diagram of an example of a conversation scenario in which associative property holds for morphism composition

FIG. 15 shows a state transition diagram of an example of a conversation scenario in which associative property holds for morphism composition. FIG. 16 shows reply sequences in the conversation scenario shown in FIG. 15. Here, $\underline{X2}$ is a citation of $\underline{X1}$. Formally, the following equations can hold.

"(Give me a clue.) $\underline{X3}$(It's $XX$.) $\underline{X4}$ (<other>|<timer>)"

="(It's $XX$.) $X4$ (<other>|<timer>)"

="(Give me a clue.) $X3$ (<other>|<timer>)"

(5) A commutative scheme can be devised. According to this feature, morphisms can be defined for a consequence to an arbitrary object. Therefore, a goal can be set for the scenario and also the entire scenario can be grasped.

(6) Miscellaneous

A "discourse scope in which an input sentence is treated as a morphism and a reply sentence as an object" is adopted in the present embodiment and it cannot be treated similarly as a "discourse scope in which an input sentence is treated as an object and a reply sentence as a morphism". Since their "search mechanisms" are completely different from each other, the latter discourse scope is not treated in the present automatic conversation system and the present conversation scenario editing device.

[1.4. Signification of Conversation Scenario Editing Device]

Signification of the conversation scenario editing device 30 is summarized hereinafter. According to a conversation scenario with objects and morphisms, following features can be served.

A reply sentence is set as an object and an input sentence is set as a morphism. (state transition).

A user can be led to a tenacious reply sentence while respecting utterances by the user. (context preservation: composition)

A specific reply sentence can be forcibly set with no regard to input sentences. (forced reply: identity element)

A specific input sentence (s) can be prompted repeatedly until the specific input sentence(s) is input. (tenacious reply: identity element)

A reply sentence(s) can be prompted in a closed loop. (closed loop: identity element)

A conversation that leads to a solution for a matter can be established. (solution for matter: associative property)

A conversation that leads toward a goal can be established. (conversation with a goal: commutative scheme)

Note that the above-described features can be organized also by a reply sequence(s). The conversation scenario editing device 30 functions to achieve the above-described features using a reply sequence(s).

By using the conversation scenario described above, it suffices that the conversation server 20 simply conducts searches. That is, the conversation server 20 grasps a current state as an object (reply sentence) in the conversation scenario. Then, the conversation server 20 searches an optimal morphism (input sentence) when a user utters while executing meaning analysis to make transition to a next state associated with an object (reply sentence) that corresponds to the searched morphism (input sentence).

Figure 17:
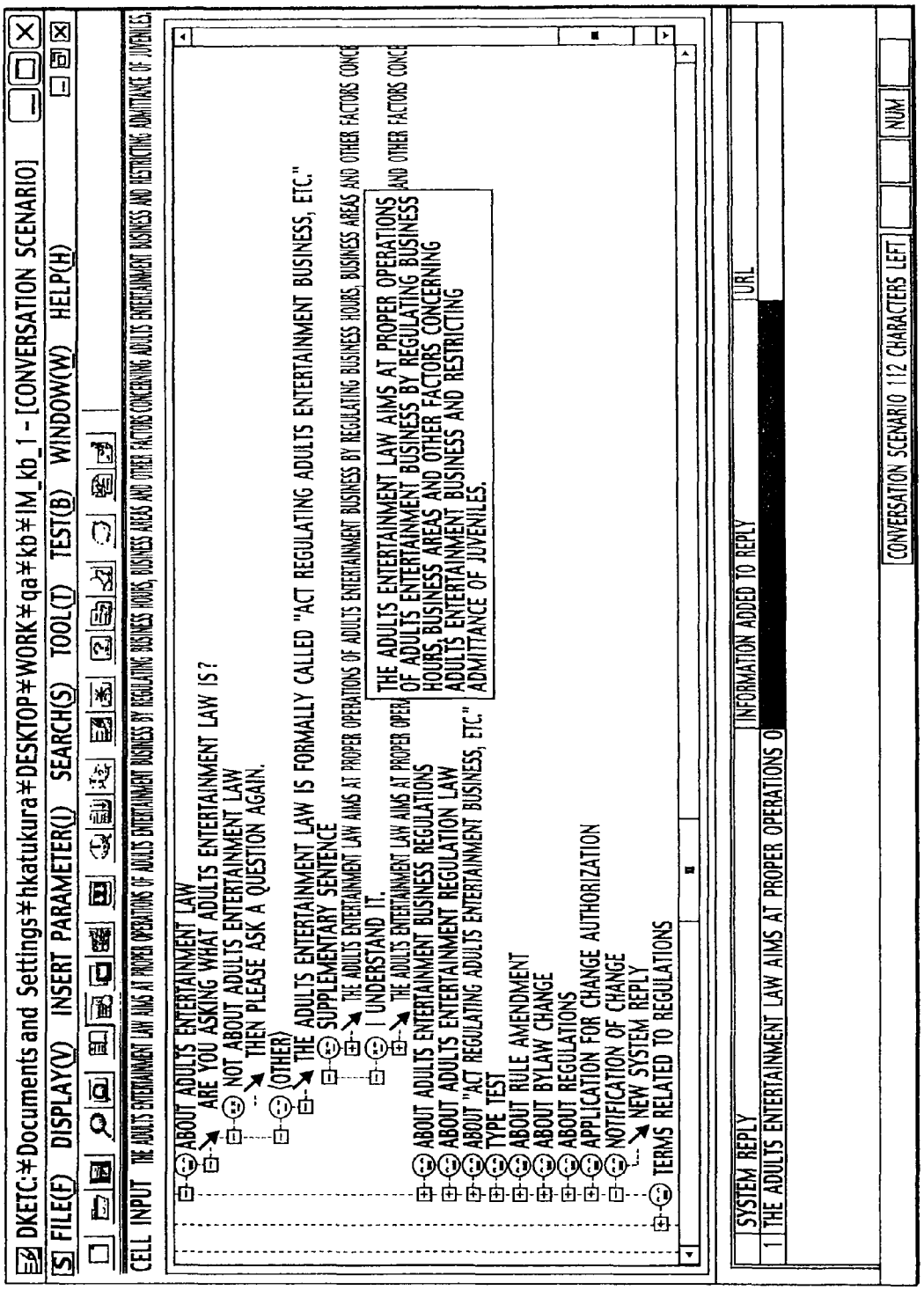
FIG. 17 shows an example of an editing screen in the conversation scenario editing device.

Note that the conversation scenario described above may not only be expressed as the state transition diagrams or the data (FIGS. 5 to 16) but also be generated or edited using a GUI such as an outline editor as shown in FIG. 17.

[2. Operation Example of Conversation Scenario Generating Unit]

Next, an operation example of the conversation scenario editing device 30 will be described.

Figure 18:
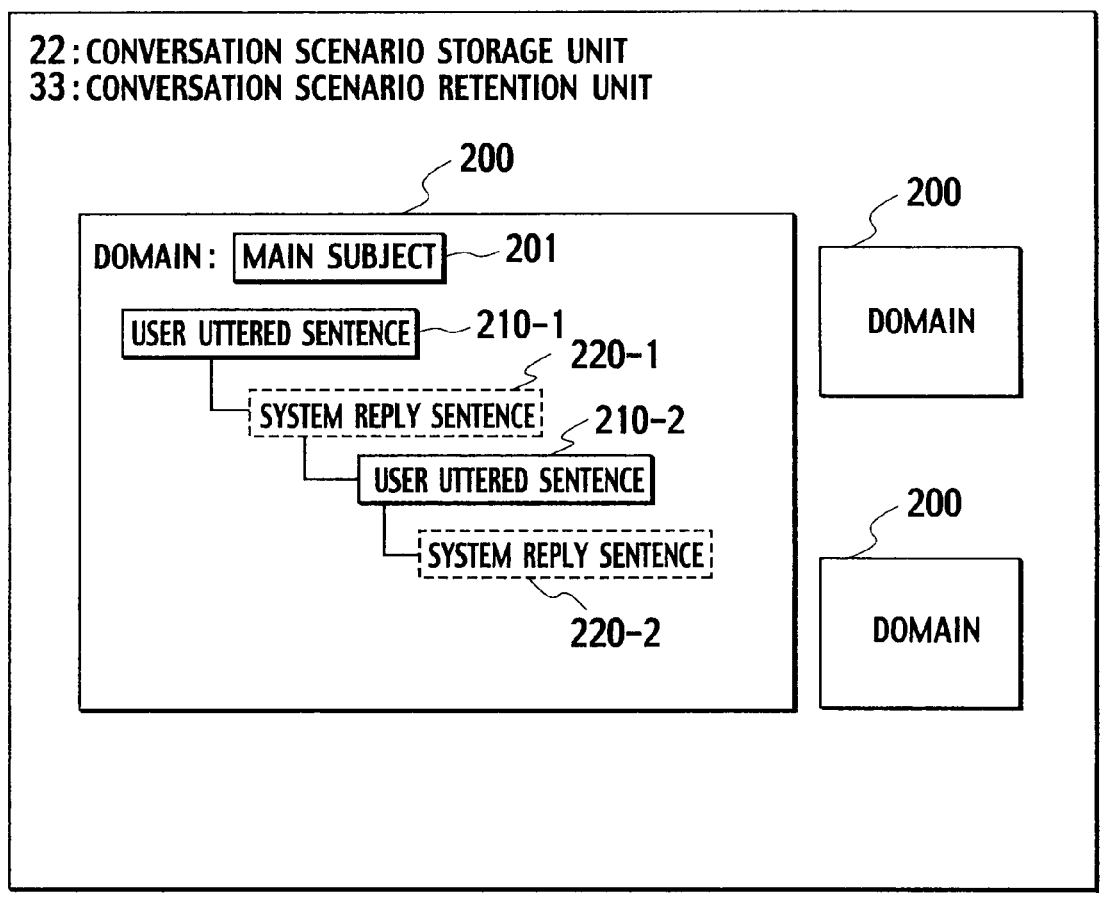
FIG. 18 shows a configuration example of data held in a conversation scenario retention unit.

The conversation scenario editing device 30 according to the embodiment can establish a conversation about various subjects (conversation themes) with a user. FIG. 18 shows a data structure example of a conversation scenario stored in the conversation scenario retention unit 33 and the conversation scenario memory 22 (hereinafter, they will be abbreviately referred to as the conversation scenario retention unit 33).

The conversation scenario retention unit 33 can hold conversation scenario data with respect to each domain 200 corresponding to a discourse scope or a main subject (conversation theme) 201. For example, the conversation scenario retention unit 33 can hold conversation scenario data about a "weather" domain and a "coffee beans" domain, respectively. When a user makes a user's utterance (an input sentence) about "weather", the conversation server 20 (more particularly, the reply process unit 21) searches a reply sentence (also referred to as a system's utterance) corresponding to the input sentence with placing higher priority to the conversation scenario data in the "weather" domain. And then, the conversation server 20 outputs the system' s utterance in response to the user's utterance. On the other hand, if a0 user makes a user's utterance about "coffee beans", the reply process unit 21 searches a system's utterance reply to the user's utterance with placing higher priority to the conversation scenario data in the "coffee beans" domain and outputs the system's utterance in response to the user's utterance.

Each domain 200 holds user's utterance sentences (input sentences) 210 and system's utterance sentences 220 each prepared as a reply to a user's utterance sentence to be output by the automatic conversation system 1. In the example shown in FIG. 18, a user's utterance 210-1 and a system's utterances 220-1 associated therewith are stored. In addition, another user's utterance sentence 210-2 assumed to be made by the user in response to the system utterance 220-1 and another system's utterance sentence 220-2 prepared as a reply to the user's utterance sentence 210-2 are stored.

For example, the conversation scenario described above provides a conversation between a user and a system as follows. user's utterance sentence 210-1: "It's a beautiful day, isn't it?"
system' s utterance sentence 220-1: "Do you like good weather?" user's utterance sentence 210-2: "Yes, I like it" system's utterance sentence 220-2: "Do you dislike a rainy day?"

The conversation scenario shown in FIG. 18 is one of the simplest configurations. According to a conversation scenario that the automatic conversation system 1 can treat, it is also possible to prepare a plurality of user's utterance sentences for a single system's utterance sentence. Therefore, the automatic conversation system 1 can reply even when a user makes one of various user's utterance sentences to the single system's utterance sentence due to variety of user's reactions.

The conversation scenario editing device 30 functions to generate conversation scenario data including a new domain (s) 200, user's utterance sentences 210 in the domain 200, and system's utterance sentences 220 that are to be stored in the conversation scenario retention unit 33. In this case, the conversation scenario editing device 30 stores the data in the conversation scenario retention unit 33.

[3. Input Examples of a Conversation Scenario]

Next, input examples of a conversation scenario will be described. FIGS. 19 to 23 show an example of an input screen transition while a conversation scenario about a certain domain 200 is input.

Figure 19:
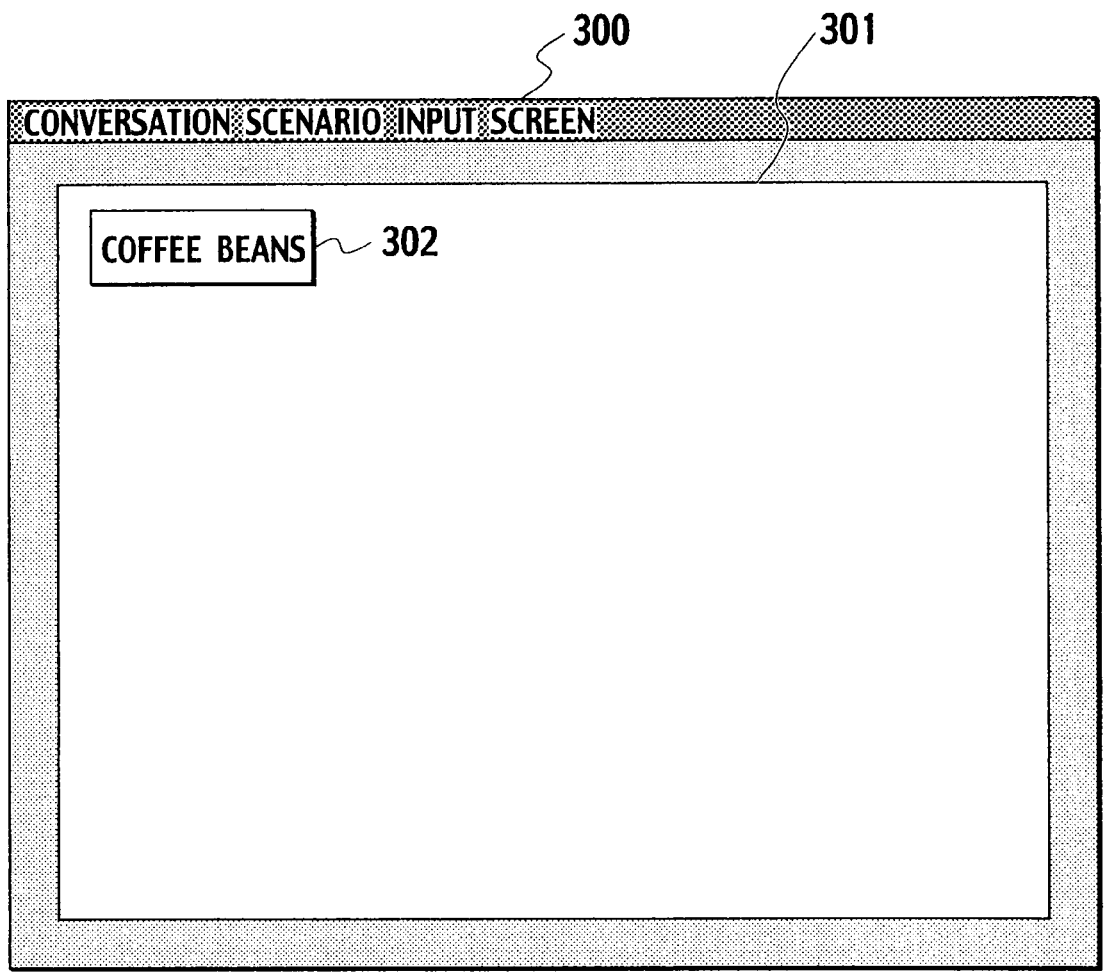
FIG. 19 shows an example of an input screen in the conversation scenario editing device.

FIG. 19 shows an example of an input interface screen generated by the conversation scenario editing device 30. Here, a case where a domain 200 is about "coffee beans" will be explained.

The conversation scenario editing device 30 (more particularly, the editor unit 32) generates a window 300 to be used as the input interface and then displays the window 300 on the output unit 34. The window 300 includes a display area 301.

Due to operations by an operator via the input unit 31, a user's utterance sentence and a system's utterance sentence thereto is displayed within the display area 301. FIG. 19 shows a state where a domain name 302 is displayed and an input of a conversation scenario to be stored in a domain 200 associated with the domain name 302 is waited.

Figure 20:
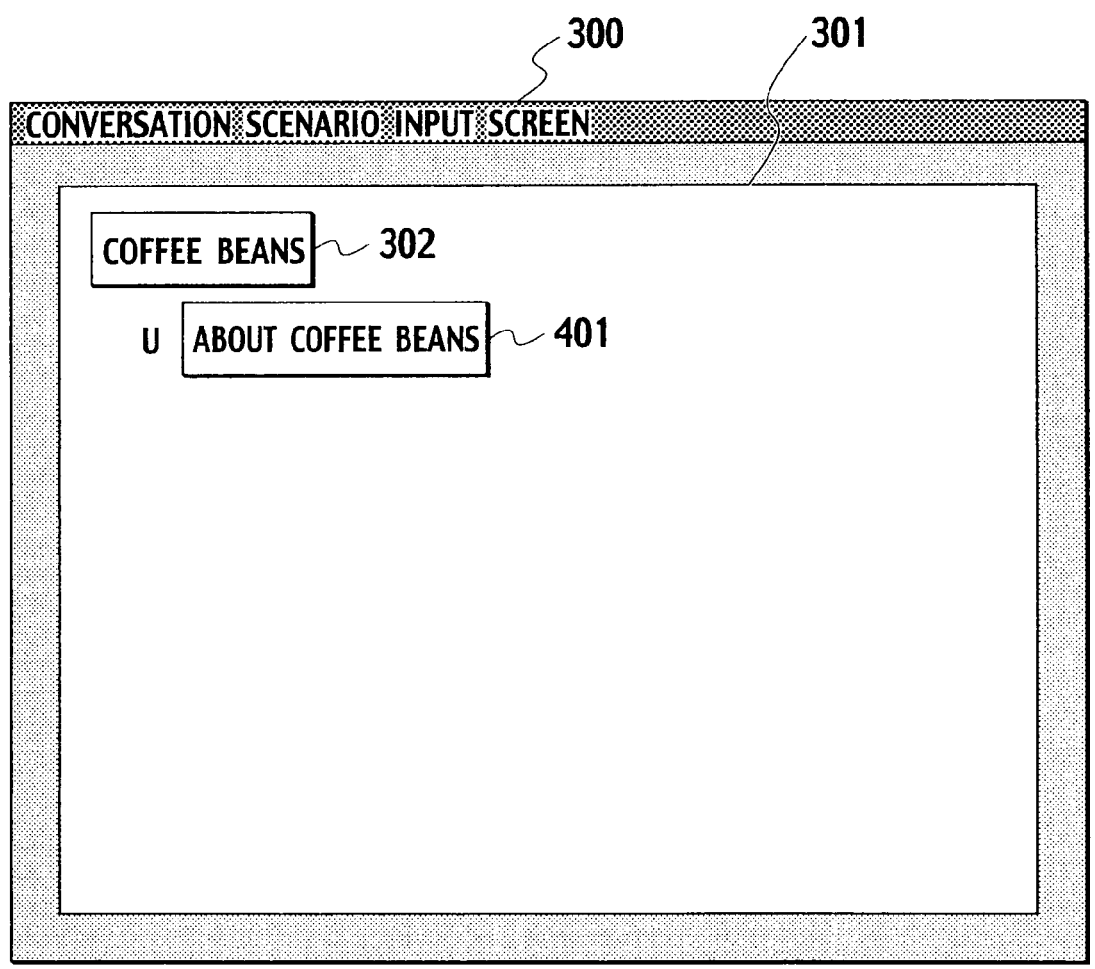
FIG. 20 shows an example of the input screen (subsequent to FIG. 19) in the conversation scenario editing device.

FIG. 20 shows a state where a user's utterance sentence 401 has been input, which serves a start of the conversation scenario to be stored in the domain 200.

When an automatic conversation is actually executed, the reply process unit 21 of the conversation server 20 determines whether a user's utterance is coincident with the user's utterance sentence 401 "About coffee beans." or whether the user's utterance is identifiable therewith. If it is determined that the user's utterance is coincident with the user's utterance sentence 401 "About coffee beans." or the user's utterance is identifiable therewith, the reply process unit 21 selects, from the conversation scenario memory 22, the domain 200 associated with the domain name 302 "coffee beans" and then extracts a system's utterance sentence in response to the user's utterance with placing higher priority to the domain 200.

Figure 21:
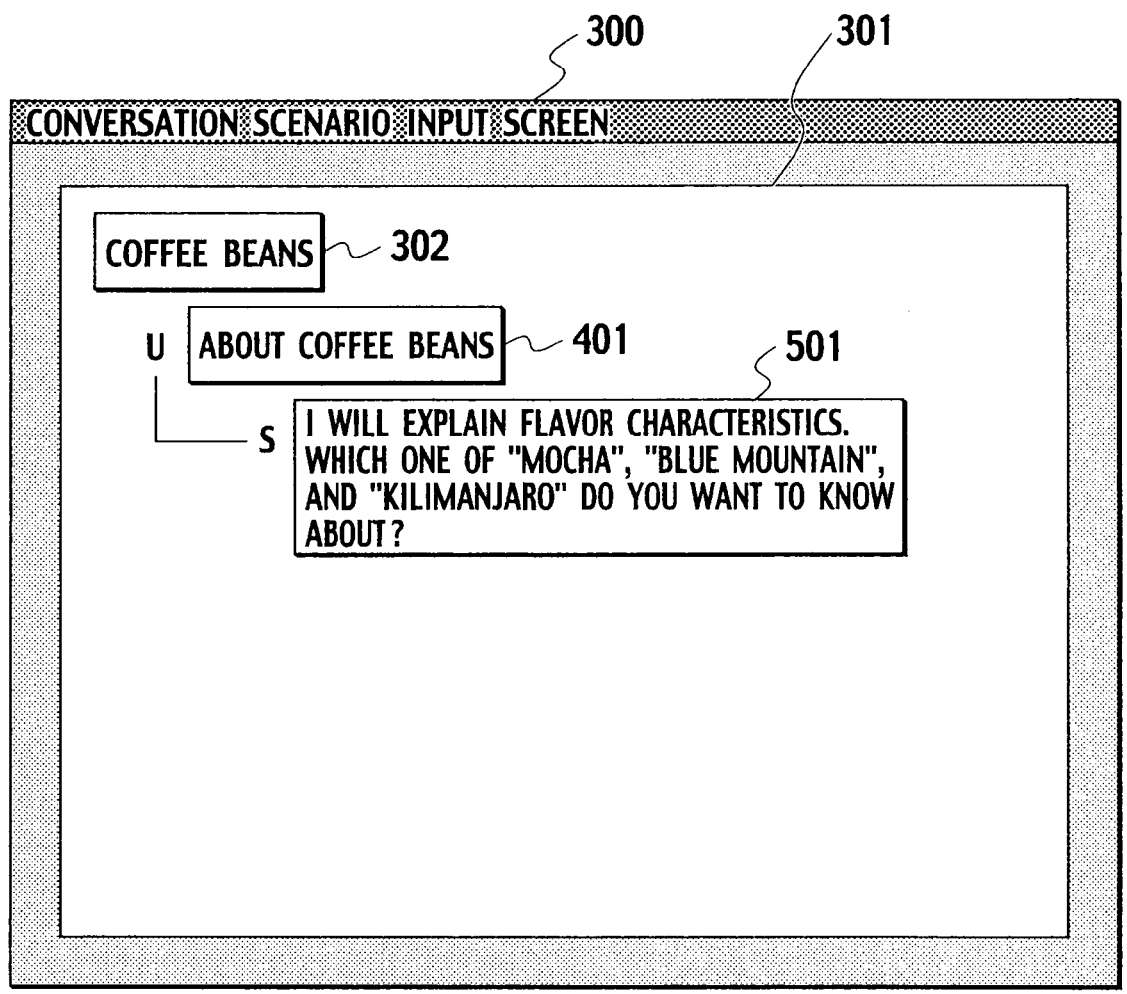
FIG. 21 shows an example of the input screen (subsequent to FIG. 20) in the conversation scenario editing device.

The operator who is in charge of creating the conversation scenario inputs a system utterance sentence that is the reply to the user's utterance sentence 401. FIG. 21 shows a state where a system's utterance sentence 501 that has been input by the operator is displayed in the window 300. In this example, written is a conversation scenario in which the automatic conversation system 1 will output a system's utterance sentence (scenario reply sentence) 501 "I will explain flavor characteristics. Which one of 'Mocha', 'Blue Mountain', and 'Kilimanjaro' do you want to know about?" in response to the user's utterance sentence 401 "About coffee beans."

Figure 22:
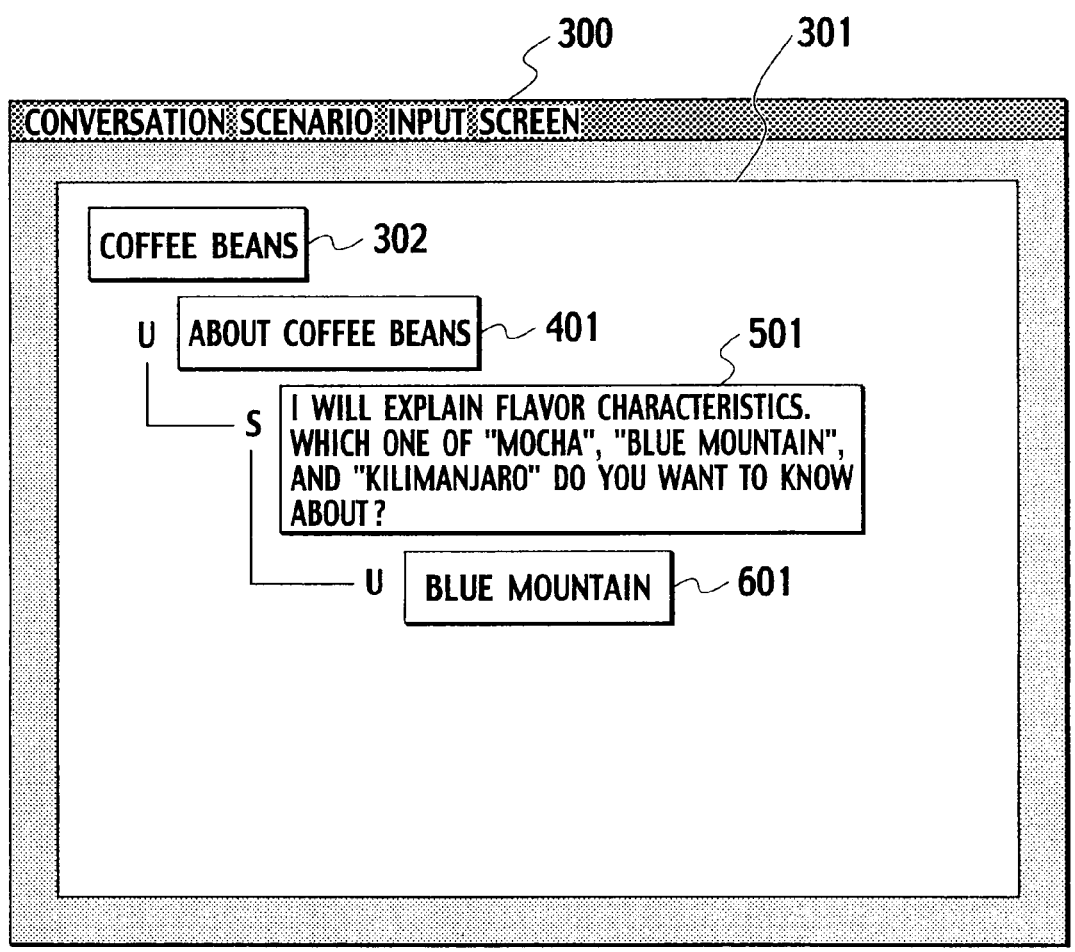
FIG. 22 shows an example of the input screen (subsequent to FIG. 21) in the conversation scenario editing device.

Subsequently, the operator inputs an expected user's utterance sentence in response to the system's utterance sentence 501. FIG. 22 shows a state where an expected user's utterance sentence 601 that has been input by the operator in response to the scenario reply sentence 501 is displayed in the window 300. In this example, the user's utterance sentence 601 "Blue Mountain." is input by the operator based on an assumption that a user will reply "Blue Mountain." in response to the system's utterance sentence 501 "I will explain flavor characteristics. Which one of 'Mocha', 'Blue Mountain', and 'Kilimanjaro' do you want to know about?"

Figure 23:
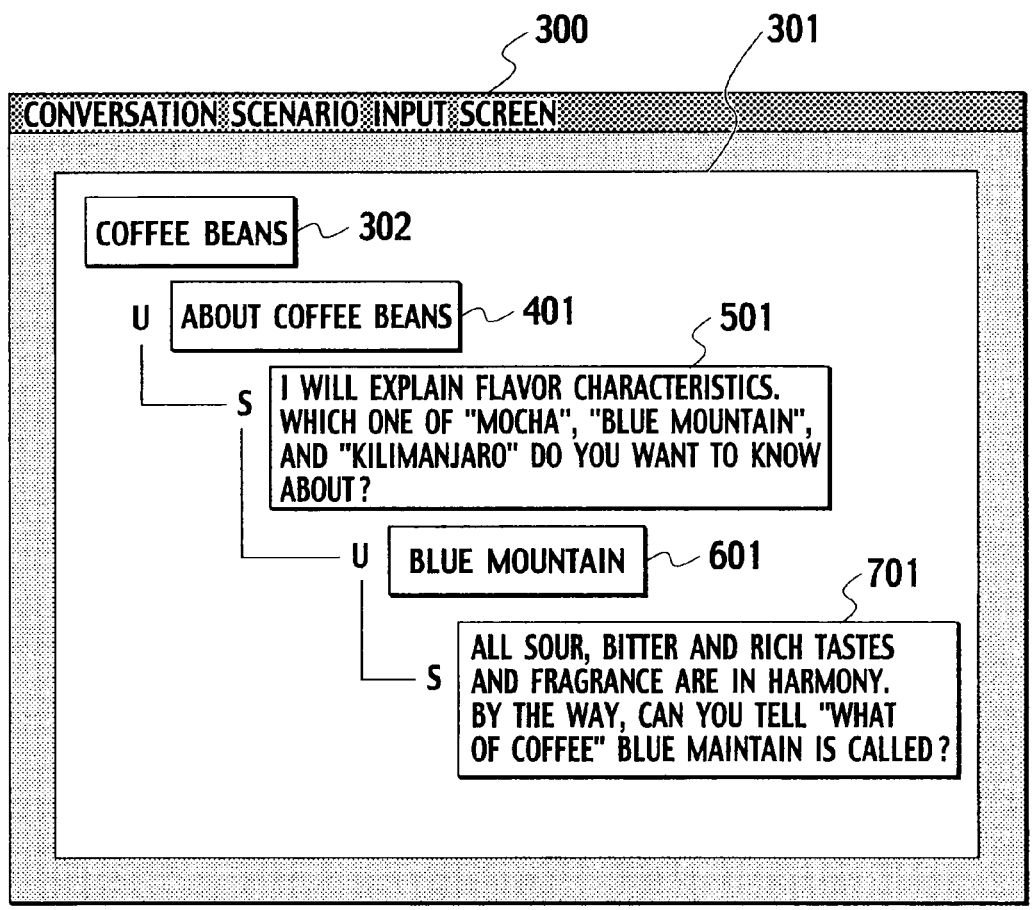
FIG. 23 shows an example of the input screen (subsequent to FIG. 22) in the conversation scenario editing device.

Subsequently, the operator inputs a system's utterance sentence in response to the user's utterance sentence 601. FIG. 23 shows a state where a system's utterance sentence 701 that has been input by the operator in response to the user's utterance sentence 601 is displayed in the window 300. In this example, the system's utterance sentence 701 as shown in FIG. 23 is input by the operator as a reply to the user's utterance sentence 601.

According to the conversation scenario, the automatic conversation system 1 can reply in a case where a user wants to know about one kind of coffee beans "Blue Mountain". Note that the operator can continue inputting user's utterance sentences and system's utterance sentences to continue a conversation between the user and the automatic conversation system 1.

The conversation scenario (aggregation of user's utterance sentences and system's utterance sentences) that was input as described above is stored in the conversation scenario retention unit 33 by the editor unit 32. Then, the conversation scenario is transferred to the conversation scenario memory 22 of the conversation server 20. When transferred to the conversation scenario memory 22, the conversation scenario may be converted or ported so as to be adapted to the conversation server 20.

The reply process unit 21 of the conversation server 20 can be configured to output a system's utterance (scenario reply) in response to a user's utterance also referring to another conversation scenario newly stored in the conversation scenario memory 22.

[4. Modified Example]

The present embodiment can also be modified as follows.

[4.1. Modified Example of the Conversation Scenario Editing Device]

Figure 24:
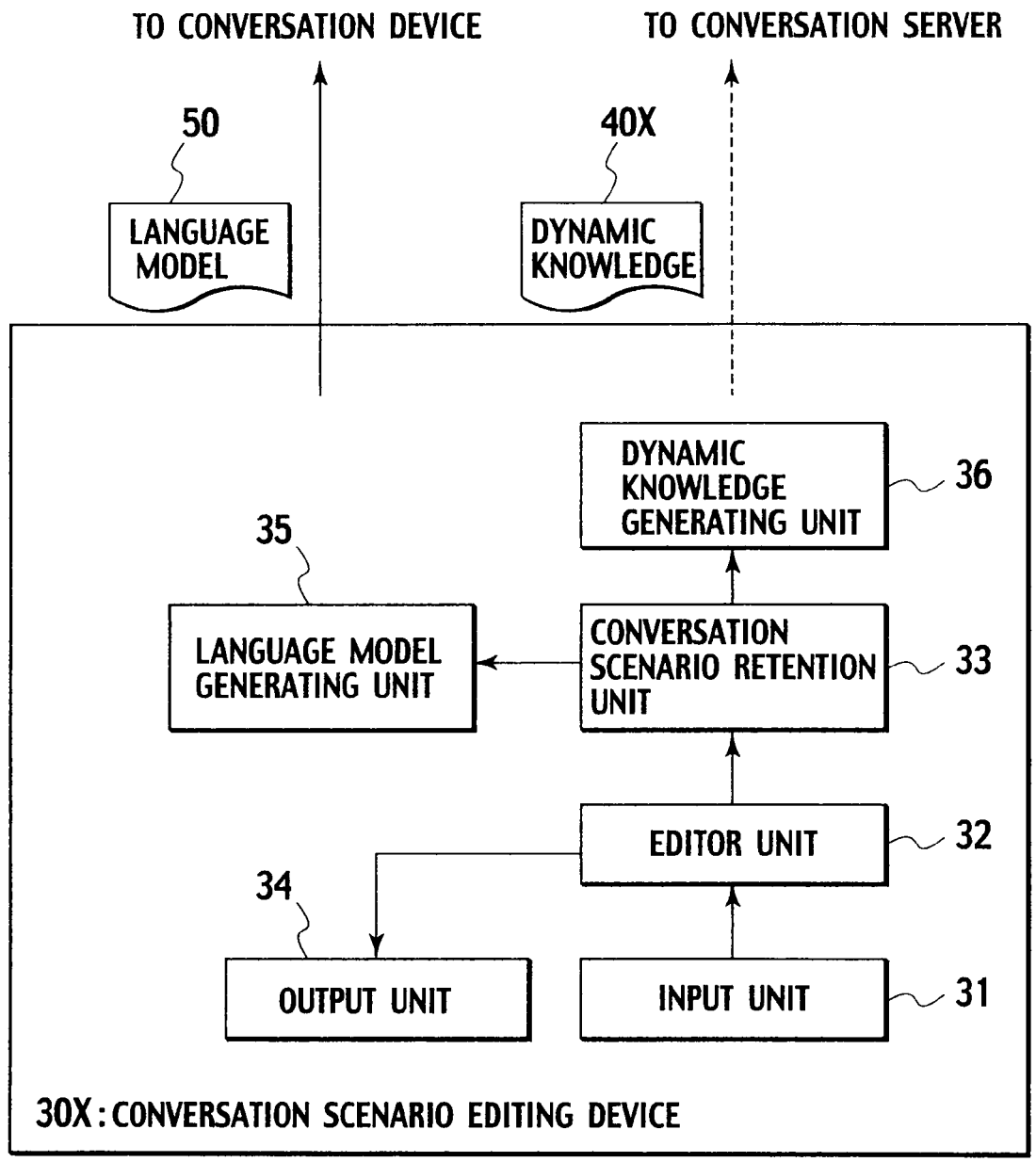
FIG. 24 is a block diagram of a modified example of the conversation scenario editing device.

FIG. 24 is a functional block diagram of a modified conversation scenario editing device 30X. The conversation scenario editing device 30X has basically a similar configuration as that of the above-described conversation scenario editing device 30 except for having a dynamic knowledge generating unit 36 connected with the conversation scenario retention unit 33. Here, identical reference numerals are allocated to identical/equivalent components, so that explanations thereof are omitted.

The dynamic knowledge generating unit 36 functions to generate dynamic knowledge 40X based on the conversation scenario 40 stored in the conversation scenario retention unit 33. The dynamic knowledge 40X is data reconstructed from the conversation scenario 40 so that the conversation server 20 can search input sentences (morphisms) and reply sentences (objects) faster and efficiently.

According to the modified example, it is possible to reduce processing load of the conversation server 20 to output a reply sentence(s) faster.

[4.2. Another Configuration Example of the Conversation Server]

Figure 25:
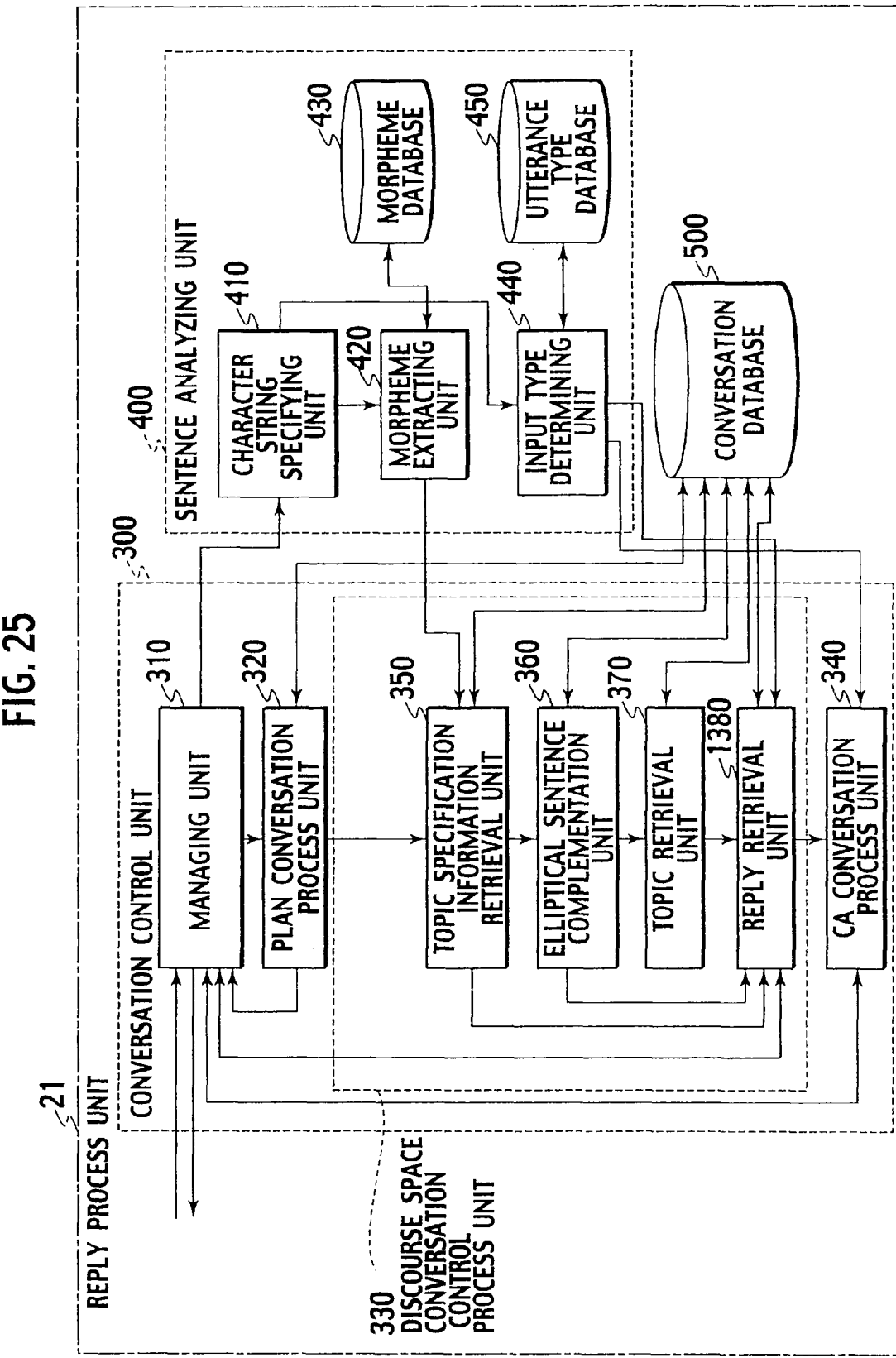
FIG. 25 is a functional block diagram of a reply process unit.

The conversation server 20 and the reply process unit 21 can employ the following configuration to establish the present invention. A configuration example of the conversation server 20, or more particularly, the reply process unit 21 will be further described in detail hereinafter. FIG. 25 is an enlarged block diagram of the reply process unit 21 and is also a block diagram showing a specific configuration example of a conversation control unit 300 and a sentence analyzing unit 400. The reply process unit 21 includes the conversation control unit 300, the sentence analyzing unit 400 and a conversation database 500. The conversation database 500 stores the conversation scenario 40 or the dynamic knowledge 40X.

[4.2.1. Sentence Analyzing Unit]

Next, a configuration example of the sentence analyzing unit 400 will be described with reference to FIG. 25.

The sentence analyzing unit 400 analyses a character string specified at the input unit 100 or the speech recognition unit 200. In the present embodiment as shown in FIG. 25, the sentence analyzing unit 400 includes a character string specifying unit 410, a morpheme extracting unit 420, a morpheme database 430, an input type determining unit 440 and an utterance type database 450. The character string specifying unit 1410 segments a series of character strings specified by the input unit 100 or the speech recognition unit 200 into segments. Each segment is a minimum segmented sentence which is segmented in the extent to keep a grammatical meaning. Specifically, if the series of the character strings have a time interval more than a certain interval, the character string specifying unit 410 segments the character strings there. The character string specifying unit 410 outputs the segmented character strings to the morpheme extracting unit 420 and the input type determining unit 440. Note that a "character string" to be described below means one segmented character string.

[4.2.1.1. Morpheme Extracting Unit]

The morpheme extracting unit 420 extracts morphemes constituting minimum units of the character string as first morpheme information from each of the segmented character strings based on each of the segmented character strings segmented by the character string specifying unit 410. In the present embodiment, a morpheme means a minimum unit of a word structure shown in a character string. For example, each minimum unit of a word structure may be a word class such as a noun, an adjective and a verb.

Figure 26:
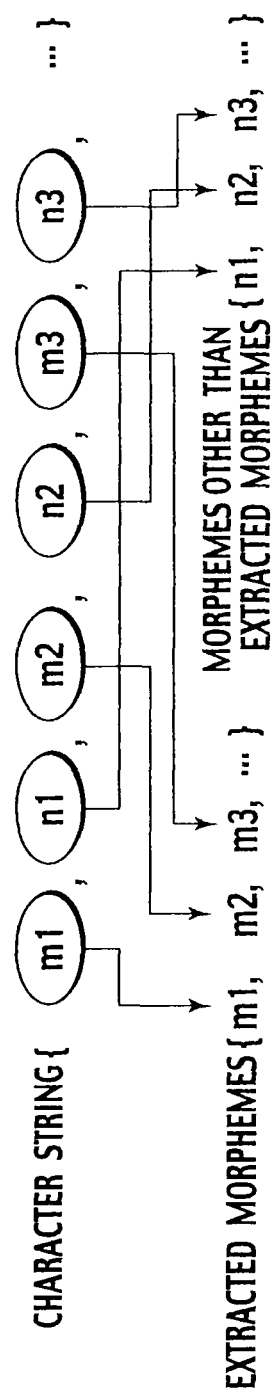
FIG. 26 is a diagram showing a relation between a character string and morphemes extracted from the character string.

In the present embodiment as shown in FIG. 26, the morphemes are indicated as m1, m2, m3, .... FIG. 26 is a diagram showing a relation between a character string and morphemes extracted from the character string. The morpheme extracting unit 420, which has received the character strings from the character string specifying unit 410, compares the received character strings and morpheme groups previously stored in the morpheme database 430 (each of the morpheme group is prepared as a morpheme dictionary in which a direction word, a reading, a word class and infected forms are described for each morpheme belonging to each word-class classification) as shown in FIG. 26. The morpheme extracting unit 420, which has executed the comparison, extracts coincident morphemes (m1, m2, . . . ) with any of the stored morpheme groups from the character strings. Other morphemes (n1, n2, n3, . . . ) than the extracted morphemes may be auxiliary verbs, for example.

The morpheme extracting unit 420 outputs the extracted morphemes to a topic specification information retrieval unit 350 as the first morpheme information. Note that the first morpheme information is not needed to be structurized. Here, "structurizing" means classifying and arranging morphemes included in a character string based on word classes. For example, it may be data conversion in which a character string as an uttered sentence is segmented into morphemes and then the morphemes are arranged in a prescribed order such as "Subject+Object +Predicate". Needless to say, the structurized first morpheme information doesn't prevent the operations of the present embodiment.

[4.2.1.2. Input Type Determining Unit]

The input type determining unit 440 determines an uttered contents type (utterance type) based on the character strings specified by the character string specifying unit 410. In the present embodiment, the utterance type is information for specifying the uttered contents type and, for example, corresponds to "uttered sentence type" shown in FIG. 27. FIG. 27 is a table showing the "uttered sentence types", two-alphabet codes representing the uttered sentence types, and uttered sentence examples corresponding to the uttered sentence types.

Here in the present embodiment as shown in FIG. 27, the "uttered sentence types" include declarative sentences (D: Declaration), time sentences (T: Time), locational sentences (L: Location), negational sentences (N: Negation) and so on. A sentence configured by each of these types is an affirmative sentence or an interrogative sentence. A "declarative sentence" means a sentence showing a user's opinion or notion. In the present embodiment, one example of the "declarative sentence" is the sentence "I like Sato" shown in FIG. 27. A "locational sentence" means a sentence involving a locational notion. A "time sentence" means a sentence involving a time-like notion. A "negational sentence" means a sentence to deny a declarative sentence. Sentence examples of the "uttered sentence types" are shown in FIG. 27.

In the present embodiment as shown in FIG. 28, the input type determining unit 440 uses a declarative expression dictionary for determination of a declarative sentence, a negational expression dictionary for determination of a negational sentence and so on in order to determine the "uttered sentence type". Specifically, the input type determining unit 440, which has received the character strings from the character string specifying unit 410, compares the received character strings and the dictionaries stored in the utterance type database 450 based on the received character string. The input type determining unit 440, which has executed the comparison, extracts elements relevant to the dictionaries among the character strings.

The input type determining unit 440 determines the "uttered sentence type" based on the extracted elements. For example, if the character string includes elements declaring an event, the input type determining unit 440 determines that the character string including the elements is a declarative sentence. The input type determining unit 440 outputs the determined "uttered sentence type" to a reply retrieval unit 380.

[4.2.2. Conversation Database]

Figure 29:
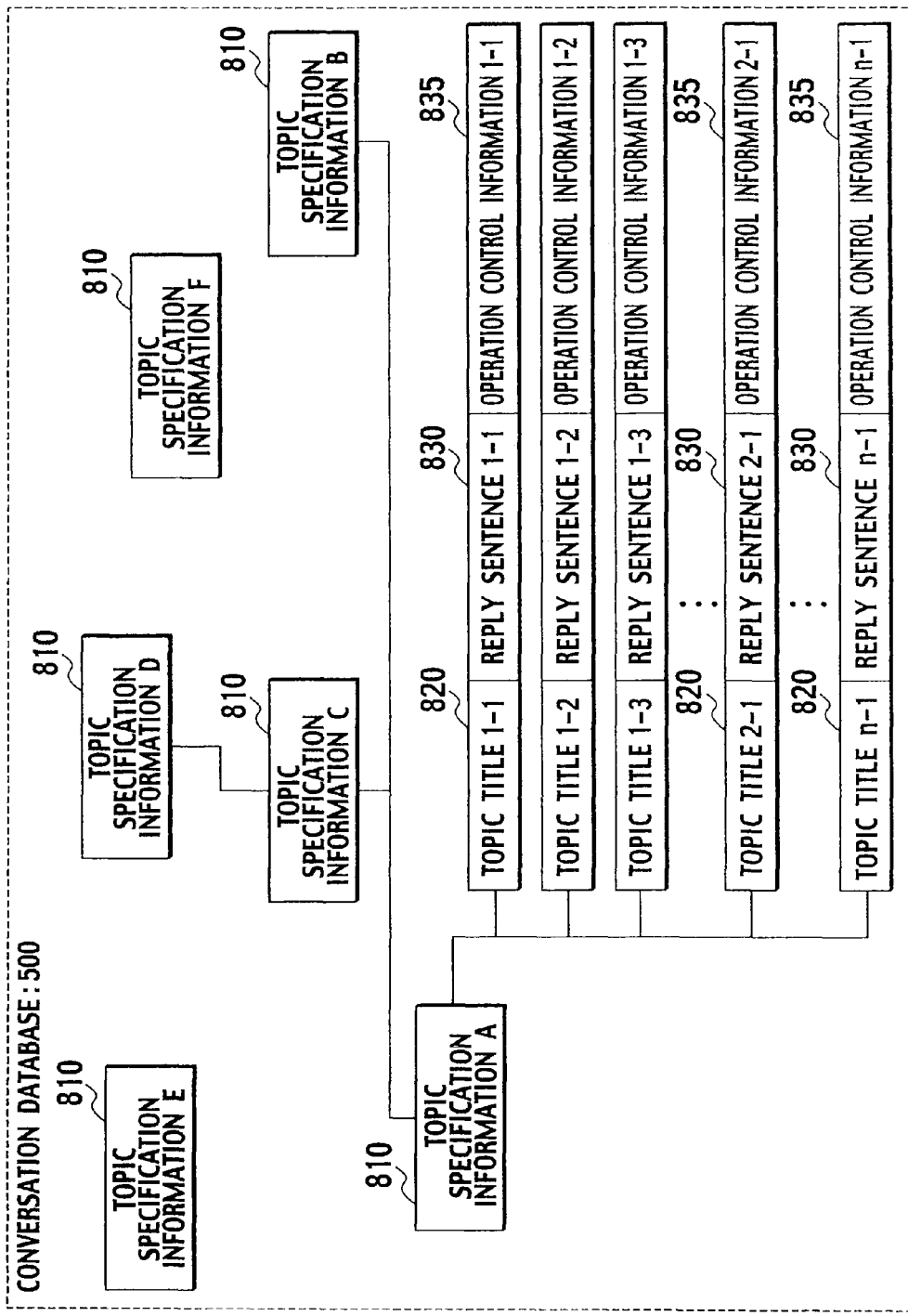
FIG. 29 is a diagram showing details of a hierarchical structure built in a conversation database.

A configuration example of data structure stored in the conversation database 500 will be described with reference to FIG. 29. FIG. 29 is a conceptual diagram showing the configuration example of data stored in the conversation database 500.

As shown in FIG. 29, the conversation database 500 stores a plurality of topic specification information 810 for specifying a conversation topic. In addition, topic specification information 810 can be associated with other topic specification information 810. For example, if topic specification information C (810) is specified, three of topic specification information A (810), B (810) and D (810) associated with the topic specification information C (810) are also specified.

Specifically in the present embodiment, topic specification information 810 means "keywords" which are relevant to input contents expected to be input from users or relevant to reply sentences to users.

The topic specification information 810 is associated with one or more topic titles 820. Each of the topic titles 820 is configured with a morpheme composed of one character, plural character strings or a combination thereof. A reply sentence 830 to be output to users and operation control information 835 corresponding to the reply sentence 830 are stored in association with each of the topic titles 820. Response types for indicating types of the reply sentences 830 are associated with the reply sentences 830, respectively.

Figure 30:
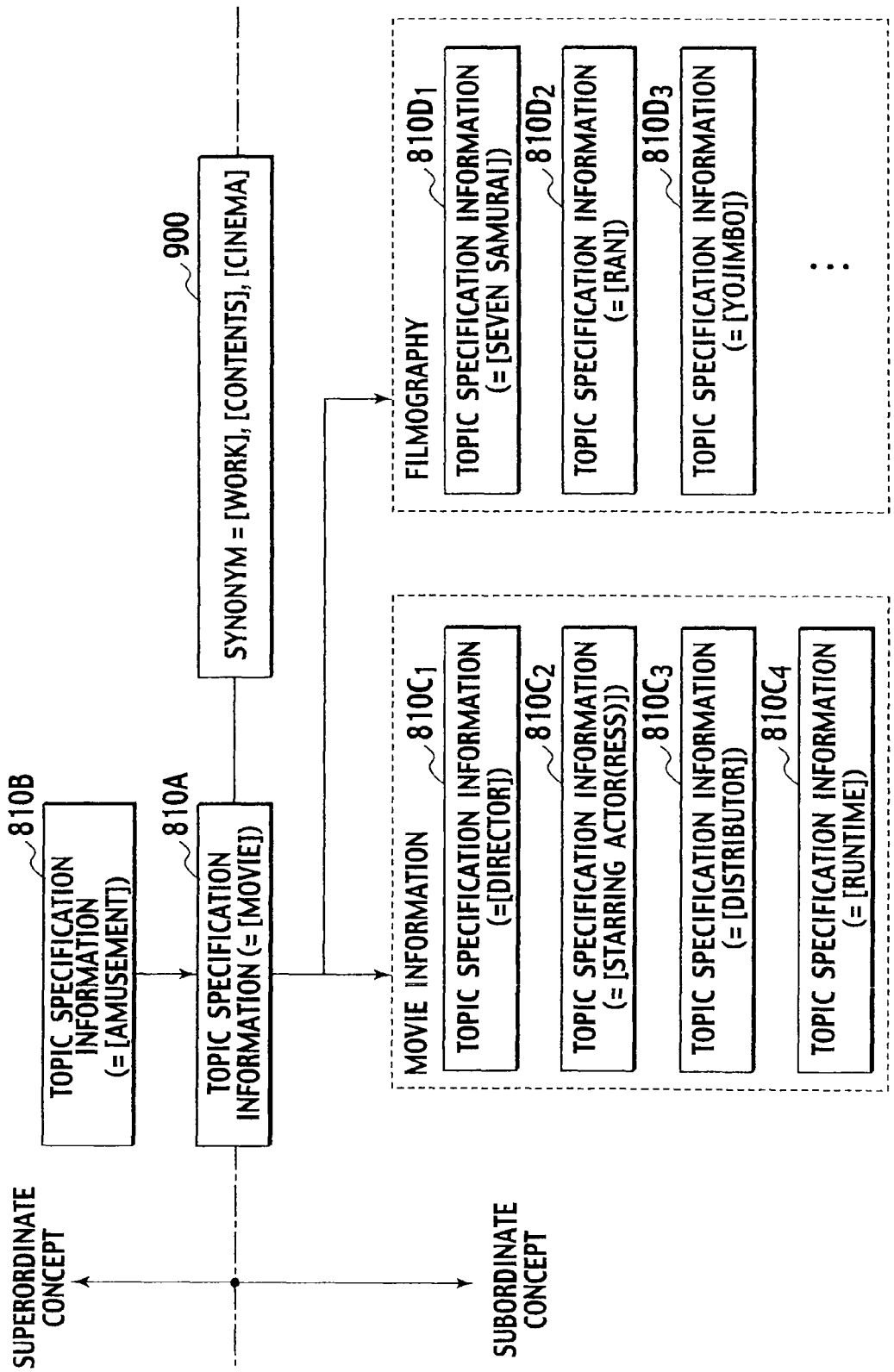
FIG. 30 is a diagram showing a refinement of topic identification information in the hierarchical structure built in the conversation database.

Next, an association between the topic specification information 810 and the other topic specification information 810 will be described. FIG. 30 is a diagram showing the association between certain topic specification information 810A and the other topic specification information 810B, 810C₁-810C₄ and 810D₁-810D₃ .... Note that a phrase "stored in association with" mentioned below indicates that, when certain information X is read out, information Y stored in association with the information X can be also read out. For example, a phrase "information Y is stored 'in association with' the information X" indicates a state where information for reading out the information Y (such as, a pointer indicating a storing address of the information Y, a physical memory address or a logical address in which the information Y is stored, and so on) is implemented in the information X.

In the example shown in FIG. 30, the topic specification information can be stored in association with the other topic specification information with respect to a superordinate concept, a subordinate concept, a synonym or an antonym (not shown in FIG. 30). For example as shown in FIG. 30, the topic specification information 810B (amusement) is stored in association with the topic specification information 810A

(movie) as a superordinate concept and stored in a higher level than the topic specification information 810B (amusement).

In addition, subordinate concepts of the topic specification information 810A (movie), the topic specification information 810C$_1$ (director), 810C$_2$ (starring actor/actress), 810C$_3$ (distributor), 810C$_4$ (runtime), 810D$_1$ ("Seven Samurai"), 810D$_2$ ("Ran"), 810D$_3$ ("Yojimbo"), . . . , are stored in association with the topic specification information 810A.

In addition, synonyms 900 are associated with the topic specification information 810A. In this example, "work", "contents" and "cinema" are stored as synonyms of "movie" which is a keyword of the topic specification information 810A. By defining these synonyms in this manner, the topic specification information 810A can be treated as included in an uttered sentence even though the uttered sentence doesn't include the keyword "movie" but includes "work", "contents" or "cinema".

In the reply process unit 21, when certain topic specification information 810 has been specified with reference to contents stored in the conversation database 500, other topic specification information 810 and the topic titles 820 or the reply sentences 830 of the other topic specification information 810, which are stored in association with the certain topic specification information 810, can be retrieved and extracted rapidly.

Next, data configuration examples of topic titles 820 (also referred as "second morpheme information") will be described with reference to FIG. 31. FIG. 31 is a diagram showing the data configuration examples of the topic titles 820.

The topic specification information 810D$_1$, 810D$_2$, 810D$_3$, . . . , include the topic titles 820$_1$, 820$_2$, . . . , the topic titles 820$_3$, 820$_4$, . . . , the topic titles 820$_5$, 820$_6$, . . . , respectively. In the present embodiment as shown in FIG. 31, each of the topic titles 820 is information composed of first specification information 1001, second specification information 1002 and third specification information 1003. Here, the first specification information 1001 is a main morpheme constituting a topic. For example, the first specification information 1001 may be a Subject of a sentence. In addition, the second specification information 1002 is a morpheme closely relevant to the first specification information 1001. For example, the second specification information 1002 may be an Object. Furthermore, the third specification information 1003 in the present embodiment is a morpheme showing a movement of a certain subject, a morpheme of a noun modifier and so on. For example, the third specification information 1003 may be a verb, an adverb or an adjective. Note that the first specification information 1001, the second specification information 1002 and the third specification information 1003 are not limited to the above meanings. The present embodiment can be effected in case where contents of a sentence can be understood based on the first specification information 1001, the second specification information 1002 and the third specification information 1003 even though they are give other meanings (other ward classes).

For example as shown in FIG. 31, if the Subject is "Seven Samurai" and the adjective is "interesting", the topic title 820$_2$ (second morpheme information) consists of the morpheme "Seven Samurai" included in the first specification information 1001 and the morpheme "interesting" included in the third specification information 1003. Note that the second specification information 1002 of this topic title 820$_2$ includes no morpheme and a symbol "*" is stored in the second specification information 1002 for indicating no morpheme included.

Note that this topic title 820$_2$ (Seven Samurai; *; interesting) has the meaning of "Seven Samurai is interesting." Hereinafter, parenthetic contents for a topic title 820$_2$ indicate the specification information 1001, the second specification information 1002 and the third specification information 1003 from the left. In addition, when no morpheme is included in any of the first to third specification information, "*" is indicated therein.

Note that the specification information constituting the topic titles 820 is not limited to three and other specification information (fourth specification information and more) may be included.

Next, the reply sentences 830 will be described with reference to FIG. 32. In the present embodiment as shown in FIG. 32, the reply sentences 830 are classified into different types (response types) such as declaration (D: Declaration), time (T: Time), location (L: Location) and negation (N: Negation) for making a reply corresponding to the uttered sentence type of the user's utterance. Note that an affirmative sentence is classified with "A" and an interrogative sentence is classified with "Q".

A configuration example of data structure of the topic specification information 810 will be described with reference to FIG. 33. FIG. 33 shows a concrete example of the topic titles 820 and the reply sentences 830 associated with the topic specification information 810 "Sato".

The topic specification information 810 "Sato" is associated with plural topic titles (820) 1-1, 1-2, . . . . Each of the topic titles (820) 1-1, 1-2, . . . is associated with reply sentences (830) 1-1, 1-2, . . . . The reply sentence 830 is prepared per each of the response types 840.

For example, when the topic title (820) 1-1 is (Sato; *; like) [these are extracted morphemes included in "I like Sato"], the reply sentences (830) 1-1 associated with the topic title (820) 1-1 include (DA: a declarative affirmative sentence "I like Sato, too.") and (TA: a time affirmative sentence "I like Sato at bat."). The after-mentioned reply retrieval unit 380 retrieves one reply sentence 830 associated with the topic title 820 with reference to an output from the input type determining unit 440.

Next-plan designation information 840 is allocated to each of the reply sentences 830. The next-plan designation information 840 is information for designating a reply sentence to be preferentially output against a user's utterance in association with the each of the reply sentences (referred as a "next-reply sentence"). The next-plan designation information 840 may be any information even if a next-reply sentence can be specified by the information. For example, the information may be a reply sentence ID, by which at least one reply sentence can be specified among all reply sentences stored in the conversation database 500.

In the present embodiment, the next-plan designation information 840 is described as information for specifying one next-reply sentence per one reply sentence (for example, a reply sentence ID). However, the next-plan designation information 840 may be information for specifying next-reply sentences per topic specification information 810 or per one topic title 820. (In this case, since plural replay sentences are designated, they are referred as a "next-reply sentence group". However, only one of the reply sentences included in the next-reply sentence group will be actually output as the reply sentence.) For example, the present embodiment can be effected in case where a topic title ID or a topic specification information ID is used as the next-plan designation information.

[4.2.3. Conversation Control Unit]

A configuration example of the conversation control unit 300 is further described with referring back to FIG. 25.

The conversation control unit 300 functions to control data transmitting between configuration components in the reply process unit 21 (the speech recognition unit 200, the sentence analyzing unit 400, the conversation database 500, the output unit 600 and the speech recognition dictionary memory 700), and determine and output a reply sentence in response to a user's utterance.

In the present embodiment shown in FIG. 25, the conversation control unit 300 includes a managing unit 310, a plan conversation process unit 320, a discourse space conversation control process unit 330 and a CA conversation process unit 340. Hereinafter, these configuration components will be described.

[4.2.3.1. Managing Unit]

The managing unit 310 functions to store discourse histories and update, if needed, the discourse histories. The managing unit 310 further functions to transmit some or entire of the stored discourse histories to a part or a whole of the discourse histories to a topic specification information retrieval unit 350, an elliptical sentence complementation unit 360, a topic retrieval unit 370 or a reply retrieval unit 380 in response to a request therefrom.

[4.2.3.2. Plan Conversation Process Unit]

The plan conversation process unit 320 functions to execute plans and establish conversations with a user according to the plans. A "plan" means providing a predetermined reply to a user in a predetermined order. The plan conversation process unit 320 will be described hereinafter.

The plan conversation process unit 320 functions to output the predetermined reply in the predetermined order in response to a user's utterance.

Figure 34:
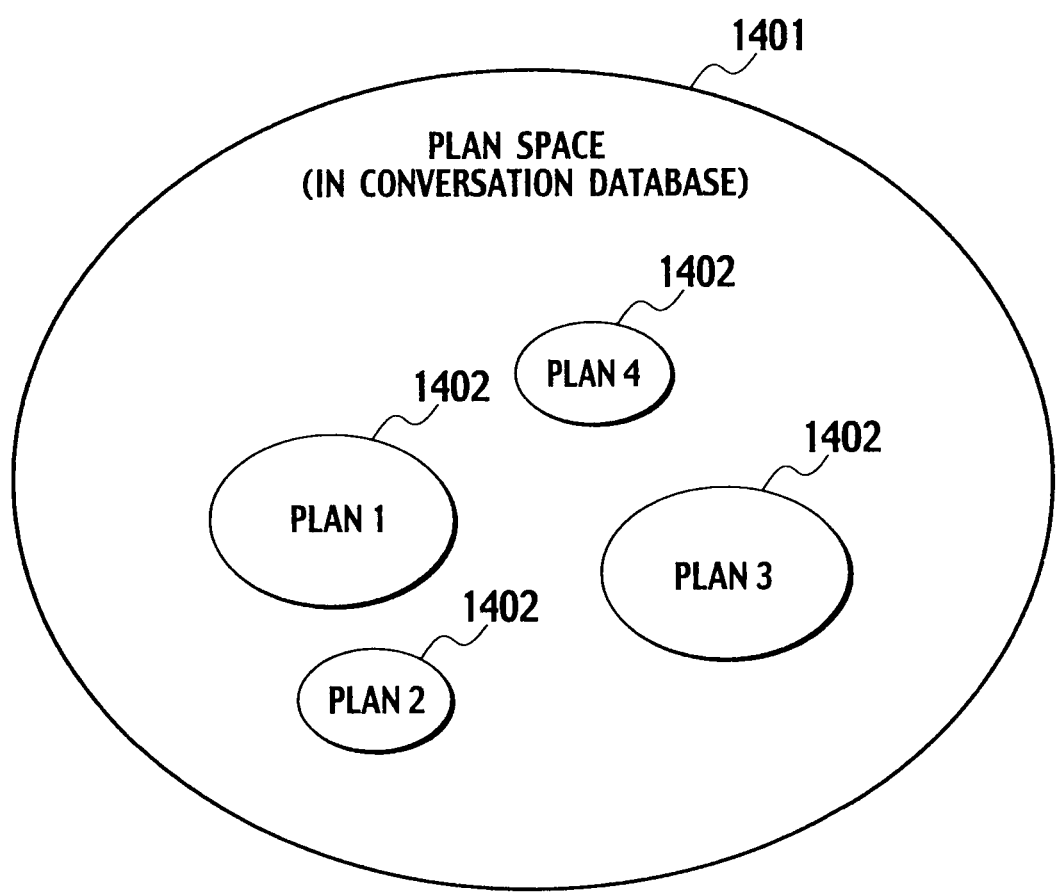
FIG. 34 is a diagram showing a plan space.

FIG. 34 is a conceptual diagram to describe plans. As shown in FIG. 34, various plans 1402 such as plural plans 1, 2, 3 and 4 are prepared in a plan space 1401. The plan space 1401 is a set of the plural plans 1402 stored in the conversation database 1500. The reply process unit 21 selects a preset plan 1402 for a start-up on an activation or a conversation start or arbitrarily selects one of the plans 1402 in the plan space 1401 in response to a user's utterance contents in order to output a reply sentence against the user's utterance by using the selected plan 1402.

Figure 35:
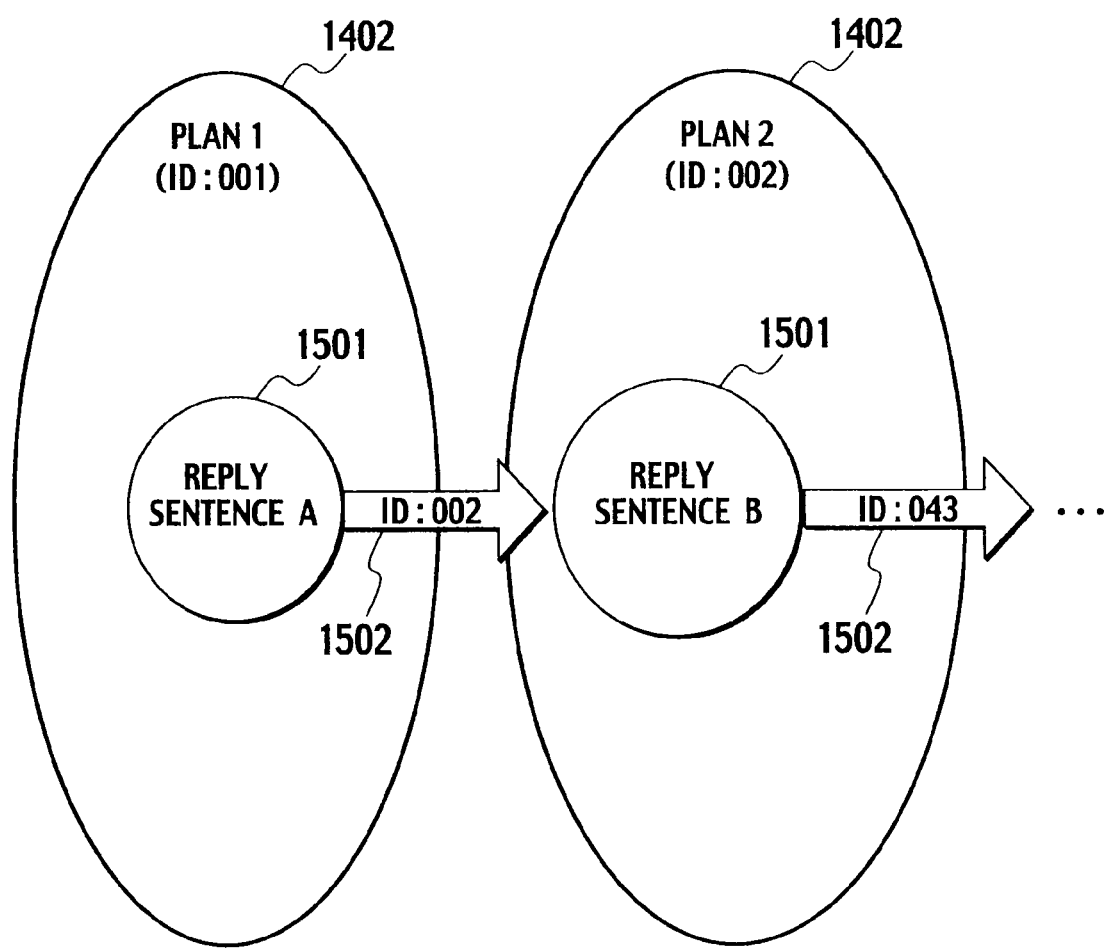
FIG. 35 is a diagram showing one example a plan transition.

FIG. 35 shows a configuration example of plans 1402. Each plan 1402 includes a reply sentence 1501 and next-plan designation information 1502 associated therewith. The next-plan designation information 1502 is information for specifying, in response to a certain reply sentence 1501 in a plan 1402, another plan 1402 including a reply sentence to be output to a user (referred as a "next-reply candidate sentence"). In this example, the plan 1 includes a reply sentence A (1501) to be output at an execution of the plan 1 by the reply process unit 21 and next-plan designation information 1502 associated with the reply sentence A (1501). The next-plan designation information 1502 is information [ID: 002] for specifying a plan 2 including a reply sentence B (1501) to be a next-reply candidate sentence to the reply sentence A (1501). Similarly, since the reply sentence B (1501) is also associated with next-plan designation information 1502, another plan 1402 ([ID: 043]: not shown) including the next-reply candidate sentence will be designated by next-plan designation information 1502 when the reply sentence B (1501) has output. In this manner, plans 1402 are chained via next-plan designation information 1502 and plan conversations in which a series of successive contents can be output to a user. In other words, since contents expected to be provided to a user (an explanatory sentence, an announcement sentence, a questionnaire and so on) are separated into plural reply sentences and the reply sentences are prepared as a plan with their order predetermined, it becomes possible to provide a series of the reply sentences to the user in response to the user's utterances. Note that a reply sentence 1501 included in a plan 1402 designated by next-plan designation information 1502 is not needed to be output to a user immediately after an output of the user's utterance in response to an output of a previous reply sentence. The reply sentence 1501 included in the plan 1402 designated by the next-plan designation information 1502 may be output after an intervening conversation on a different topic from a topic in the plan between the reply process unit 21 and the user.

Note that the reply sentence 1501 shown in FIG. 35 corresponds to a sentence string of one of the reply sentences 830 shown in FIG. 33. In addition, the next-plan designation information 1502 shown in FIG. 35 corresponds to the next-plan designation information 840 shown in FIG. 33.

Figure 36:
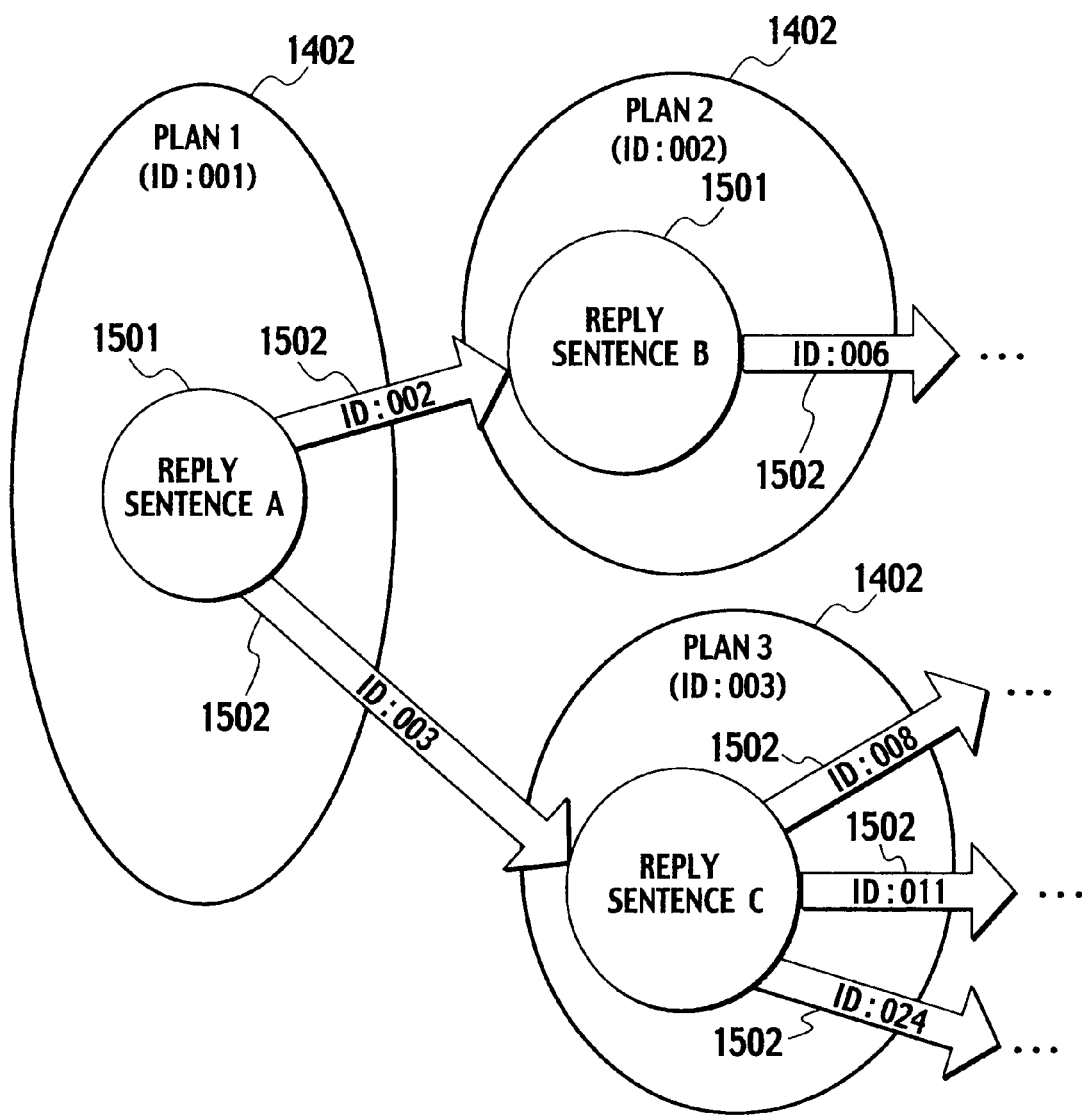
FIG. 36 is a diagram showing another example of the plan transition.

Note that linkages between the plans 1402 are not limited to form a one-dimensional geometry shown in FIG. 35. FIG. 36 shows an example of plans 1402 with another linkage geometry. In the example shown in FIG. 36, a plan 1 (1402) includes two of next-plan designation information 1502 to designate two reply sentences as next replay candidate sentences, in other words, to designate two plans 1402. The two of next-plan designation information 1502 are prepared in order that the plan 2 (1402) including a reply sentence B (1501) and the plan 3 (1402) including a reply sentence C (1501) are to be designated as plans each including a next-reply candidate sentence. Note that the reply sentences are selective and alternative, so that, when one has been output, another is not output and then the plan 1 (1501) is terminated. In this manner, the linkages between the plans 1402 is not limited to forming a one-dimensional geometry and may form a tree-diagram-like geometry or a cancellous geometry.

Note that it is not limited that how many next-reply candidate sentences each plan 1402 includes. In addition, no next-plan designation information 1502 may be included in a plan 1402 which terminates a conversation.

Figure 37:
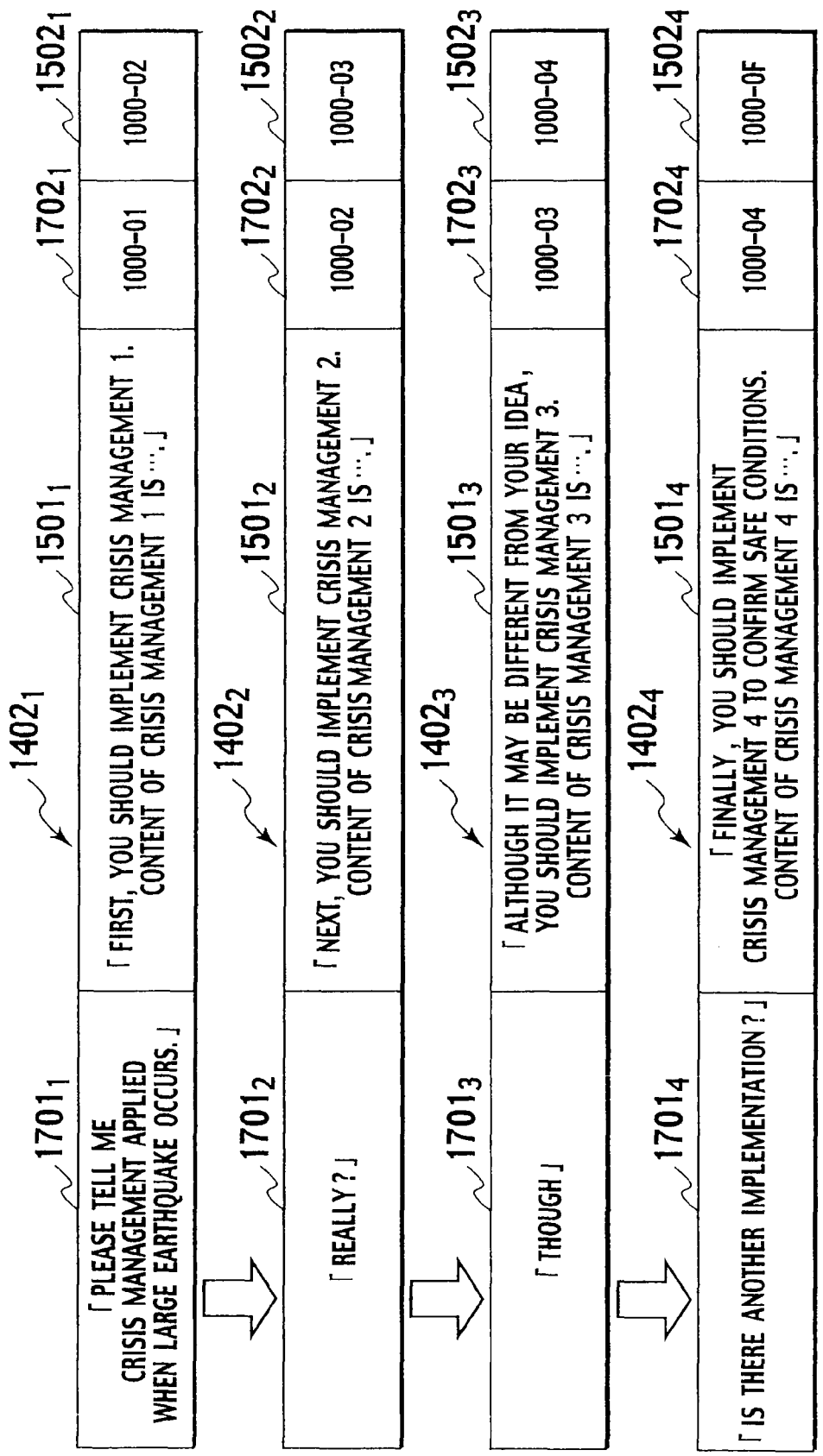
FIG. 37 is a diagram showing details of a plan conversation control process.

FIG. 37 shows an example of a certain series of plans 1402. As shown in FIG. 37, this series of plans $1402_1$ to $1402_4$ are associated with reply sentences $1501_1$ to $1501_4$ which notify crisis management information to a user. The reply sentences $1501_1$ to $1501_4$ constitute one coherent topic (set of explanatory sentences) as a whole. Each of the plans $1402_1$ to $1402_4$ includes ID data $1702_1$ to $1702_4$ for indicating itself such as "1000-01, 1000-02", "1000-03" and "1000-04", respectively. Note that each value after a hyphen in the ID data is information indicating an output order. In addition, each of the plans $1402_1$ to $1402_4$ further includes ID data $1502_1$ to $1502_4$ as the next-plan designation information. Although the content of the next-plan designation information $1502_4$ is "1000-0F", the "0F" after a hyphen is information indicating that no plan exists to be output next and the reply sentence is the last in the coherent topic (set of explanatory sentences).

In this example, the plan conversation process unit 320 starts to execute this series of plans when a user has uttered 's utterance has been "Please tell me a crisis management applied when a large earthquake occurs." Specifically, the plan conversation process unit 320 searches in the plan space 1401 and checks whether or not a plan 1402 including a reply sentence $1501_1$ associated with the user's utterance "Please tell me a crisis management applied when a large earthquake occurs," when the plan conversation process unit 320 has received the user's utterance "Please tell me a crisis management applied when a large earthquake occurs." In this example, a user's utterance character string $1701_1$ associated with the user's utterance "Please tell me a crisis management applied when a large earthquake occurs," is associated with a plan $1402_1$.

The plan conversation process unit 320 retrieves the reply sentence $1501_1$ included in the plan $1402_1$ on discovering the plan $1402_1$ and outputs the reply sentence $1501_1$ to the user as a reply sentence in response to the user's utterance. And then, the plan conversation process unit 320 specifies the next-reply candidate sentence with reference to the next-plan designation information $1502_1$.

Next, the plan conversation process unit 320 executes the plan $1402_2$ on receiving another user's utterance via the input unit 100, a speech recognition unit 200 or the like after an output of the reply sentence $1501_1$. Specifically, the plan conversation process unit 320 judges whether or not to execute the plan $1402_2$ designated by the next-plan designation information $1502_1$, in other words, whether or not to output the second reply sentence $1501_2$. More specifically, the plan conversation process unit 320 compares a user's utterance character string (also referred as an illustrative sentence) $1701_2$ associated with the reply sentence $1501_2$ and the received user's utterance, or compares a topic title 820 (not shown in FIG. 37) associated with the reply sentence $1501_2$ and the received user's utterance. And then, the plan conversation process unit 320 determines whether or not the two are related to each other. If the two are related to each other, the plan conversation process unit 320 outputs the second reply sentence $1501_2$. In addition, since the plan $1402_2$ including the second reply sentence $1501_2$ also includes the next-plan designation information $1502_2$, the next-reply candidate sentence is specified.

Similarly, according to ongoing user's utterances, the plan conversation process unit 320 transit into the plans $1402_3$ and $1402_4$ in turn and can output the third and fourth reply sentences $1501_3$ and $1501_4$. Note that, since the fourth reply sentence $1501_4$ is the final reply sentence, the plan conversation process unit 320 terminates plan-executions when the fourth reply sentence $1501_4$ has been output. In this manner, the plan conversation process unit 320 can provide previously prepared conversation contents to the user in a predetermined order by sequentially executing the plans $1402_2$ to $1402_4$.

[4.2.3.3. Discourse Space Conversation Control Process Unit]

The configuration example of the conversation control unit 300 is further described with referring back to FIG. 25.

The discourse space conversation control process unit 330 includes the topic specification information retrieval unit 350, the elliptical sentence complementation unit 360, the topic retrieval unit 370 and the reply retrieval unit 380. The managing unit 310 totally controls the conversation control unit 300.

A "discourse history" is information for specifying a conversation topic or theme between a user and the reply process unit 21 and includes at least one of "focused topic specification information", a "focused topic title", "user input sentence topic specification information" and "reply sentence topic specification information". The "focused topic specification information", the "focused topic title" and the "reply sentence topic specification information" are not limited to be defined from a conversation done just before but may be defined from the previous "focused topic specification information", the "focused topic title" and the "reply sentence topic specification information" during a predetermined past period or from an accumulated record thereof.

Hereinbelow, each of the units constituting the discourse space conversation control process unit 1330 will be described.

[4.2.3.3.1. Topic Specification Information Retrieval Unit]

The topic specification information retrieval unit 350 compares the first morpheme information extracted by the morpheme extracting unit 420 and the topic specification information, and then retrieves the topic specification information corresponding to a morpheme in the first morpheme information among the topic specification information. Specifically, when the first morpheme information received from the morpheme extracting unit 420 is two morphemes "Sato" and "like", the topic specification information retrieval unit 350 compares the received first morpheme information and the topic specification information group.

If a focused topic title $820_{focus}$ to (indicated as $820_{focus}$ to be differentiated from previously retrieved topic titles or other topic titles) includes a morpheme (for example, "Sato") in the first morpheme information, the topic specification information retrieval unit 350 outputs the focused topic title $820_{focus}$ to the reply retrieval unit 380. On the other hand, if no topic title includes the morpheme in the first morpheme information, the topic specification information retrieval unit 350 determines user input sentence topic specification information based on the received first morpheme information, and then outputs the first morpheme information and the user input sentence topic specification information to the elliptical sentence complementation unit 360. Note that the "user input sentence topic specification information" is topic specification information corresponding-to or probably-corresponding-to a morpheme relevant to topic contents talked by a user among morphemes included in the first morpheme information.

[4.2.3.3.2. Elliptical Sentence Complementation Unit]

The elliptical sentence complementation unit 360 generates various complemented first morpheme information by complementing the first morpheme information with the previously retrieved topic specification information 810 (hereinafter referred as the "focused topic specification information") and the topic specification information 810 included in the final reply sentence (hereinafter referred as the "reply sentence topic specification information"). For example, if a user's utterance is "like", the elliptical sentence complementation unit 360 generates the complemented first morpheme information "Sato, like" by including the focused topic specification information "Sato" into the first morpheme information "like".

In other words, if it is assumed that the first morpheme information is defined as "W" and a set of the focused topic specification information and the reply sentence topic specification information is defined as "D", the elliptical sentence complementation unit 360 generates the complemented first morpheme information by including an element(s) in the set "D" into the first morpheme information "W".

In this manner, in case where, for example, a sentence constituted with the first morpheme information is an elliptical sentence which is unclear as language, the elliptical sentence complementation unit 360 can include, by using the set "D", an element(s) (for example, "Sato") in the set "D" into the first morpheme information "W". As a result, the elliptical sentence complementation unit 360 can complement the first morpheme information "like" into the complemented first morpheme information "Sato, like". Note that the complemented first morpheme information "Sato, like" corresponds to a user's utterance "I like Sato."

That is, even when user's utterance contents are provided as an elliptical sentence, the elliptical sentence complementation unit 360 can complement the elliptical sentence by using the set "D". As a result, even when a sentence constituted with the first morpheme information is an elliptical sentence, the elliptical sentence complementation unit 360 can complement the sentence into an appropriate sentence as language.

In addition, the elliptical sentence complementation unit 360 retrieves the topic title 820 related to the complemented first morpheme information based on the set "D". If the topic title 820 related to the complemented first morpheme information has been found, the elliptical sentence complementation unit 360 outputs the topic title 820 to the reply retrieval unit 380. The reply retrieval unit 380 can output a reply sentence 830 best-suited for the user's utterance contents based on the appropriate topic title 820 found by the elliptical sentence complementation unit 360.

Note that the elliptical sentence complementation unit 360 is not limited to including an element(s) in the set "D" into the first morpheme information. The elliptical sentence complementation unit 360 may include, based on a focused topic title, a morpheme(s) included in any of the first, second and third specification information in the topic title, into the extracted first morpheme information.

[4.2.3.3.3. Topic Retrieval Unit]

The topic retrieval unit 370 compares the first morpheme information and topic titles 820 associated with the user input sentence topic specification information to retrieve a topic title 820 best-suited for the first morpheme information among the topic titles 820 when the topic title 820 has not been determined by the elliptical sentence complementation unit 360.

Specifically, the topic retrieval unit 370, which has received a retrieval command signal from the elliptical sentence complementation unit 360, retrieves the topic title 820 best-suited for the first morpheme information among the topic titles associated with the user input sentence topic specification information based on the user input sentence topic specification information and the first morpheme information which are included in the received retrieval command signal. The topic retrieval unit 370 outputs the retrieved topic title 820 as a retrieval result signal to the reply retrieval unit 380.

Above-mentioned FIG. 33 shows the concrete example of the topic titles 820 and the reply sentences 830 associated with the topic specification information 810 (="Sato"). For example as shown in FIG. 33, since topic specification information 810 (="Sato") is included in the received first morpheme information "Sato, like", the topic retrieval unit 370 specifies the topic specification information 810 (="Sato") and then compares the topic titles (820) 1-1, 1-2, . . . associated with the topic specification information 810 (="Sato") and the received first morpheme information "Sato, like".

The topic retrieval unit 370 retrieves the topic title (820) 1-1 (Sato; *; like) related to the received first morpheme information "Sato, like" among the topic titles (820) 1-1, 1-2, . . . based on the comparison result. The topic retrieval unit 370 outputs the retrieved topic title (820) 1-1 (Sato; *; like) as a retrieval result signal to the reply retrieval unit 380.

[4.2.3.3.4. Reply Retrieval Unit]

The reply retrieval unit 380 retrieves, based on the topic title 820 retrieved by the elliptical sentence complementation unit 360 or the topic retrieval unit 370, a reply sentence associated with the topic title 820. In addition, the reply retrieval unit 380 compares, based on the topic title 820 retrieved by the topic retrieval unit 370, the response types associated with the topic title 820 and the utterance type determined by the input type determining unit 440. The reply retrieval unit 380, which has executed the comparison, retrieves one response type related to the determined utterance type among the response types.

In the example shown in FIG. 33, when the topic title retrieved by the topic retrieval unit 370 is the topic title 1-1 (Sato; *; like), the reply retrieval unit 380 specifies the response type (for example, DA) coincident with the "uttered sentence type" (DA) determined by the input type determining unit 440 among the reply sentences 1-1 (DA, TA and so on) associated with the topic title 1-1. The reply retrieval unit 380, which has specified the response type (DA), retrieves the reply sentence 1-1 ("I like Sato, too.") associated with the response type (DA) based on the specified response type (DA).

Here, "A" in above-mentioned "DA", "TA" and so on means an affirmative form. Therefore, when the utterance types and the response types include "A", it indicates an affirmation on a certain matter. In addition, the utterance types and the response types can include the types of "DQ", "TQ" and so on. "Q" in "DQ", "TQ" and so on means a question about a certain matter.

If the response type takes an interrogative form (Q), a reply sentence associated with this response type takes an affirmative form (A). A reply sentence with an affirmative form (A) may be a sentence for replying to a question and so on. For example, when an uttered sentence is "Have you ever operated slot machines?", the utterance type of the uttered sentence is an interrogative form (Q). A reply sentence associated with this interrogative form (Q) may be "I have operated slot machines before," (affirmative form (A)), for example.

On the other hand, when the response type is an affirmative form (A), a reply sentence associated with this response type takes an interrogative form (Q). A reply sentence in an interrogative form (Q) may be an interrogative sentence for asking back against uttered contents, an interrogative sentence for getting out a certain matter. For example, when the uttered sentence is "Playing slot machines is my hobby," the utterance type of this uttered sentence takes an affirmative form (A). A reply sentence associated with this affirmative form (A) may be "Playing pachinko is your hobby, isn't it?" (an interrogative sentence (Q) for getting out a certain matter), for example.

The reply retrieval unit 380 outputs the retrieved reply sentence 830 as a reply sentence signal to the managing unit 310. The managing unit 310, which has received the reply sentence signal from the reply retrieval unit 380, outputs the received reply sentence signal to the output unit 600.

[4.2.3.4. CA Conversation Process Unit]

When a reply sentence in response to a user's utterance has not been determined by the plan conversation process unit 320 or the discourse space conversation control process unit 330, the CA conversation process unit 340 functions to output a reply sentence for continuing a conversation with a user according to contents of the user's utterance.

With that, describing the configuration example of the reply process unit 21 has ended.

[4.2.4. Conversation Control Method]

The reply process unit 21 with the above-mentioned configuration puts a conversation control method in execution by operating as described hereinbelow. Operations of the reply process unit 21, more specifically the conversation control unit 300, according to the present embodiment will be described.

Figure 38:
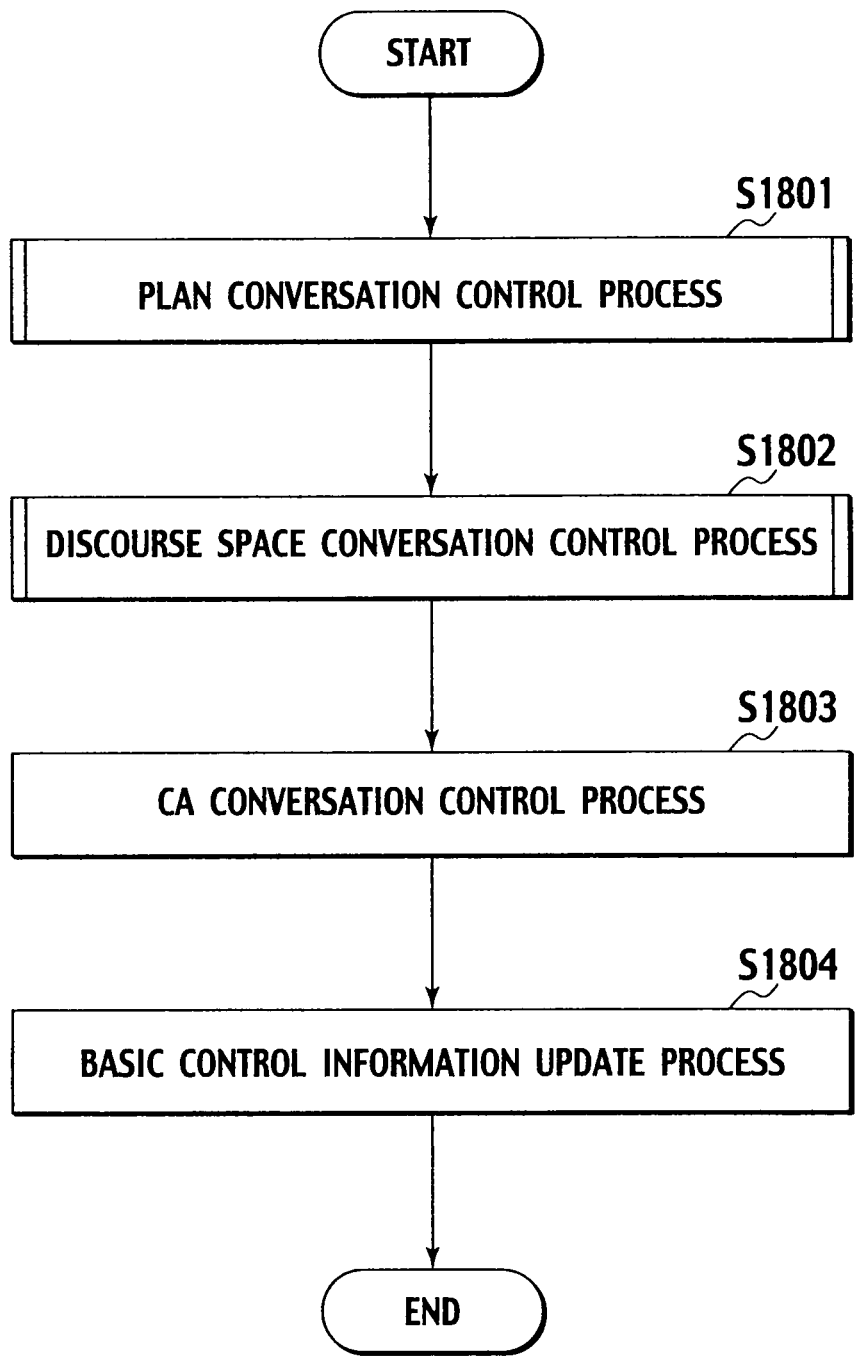
FIG. 38 is a flow chart showing an example of a main process by a conversation control unit.

FIG. 38 is a flow chart showing an example of a main process executed by conversation control unit 300. This main process is a process executed each time when the conversation control unit 300 receives a user's utterance. A reply sentence in response to the user's utterance is output due to an execution of this main process, so that a conversation (an interlocution) between the conversation unit 100 and the conversation server 20 (reply process unit 21) is established.

Upon entering the main process, the conversation control unit 300, more specifically the plan conversation process unit 320 firstly executes a plan conversation control process (S1801). The plan conversation control process is a process for executing a plan(s).

Figure 39:
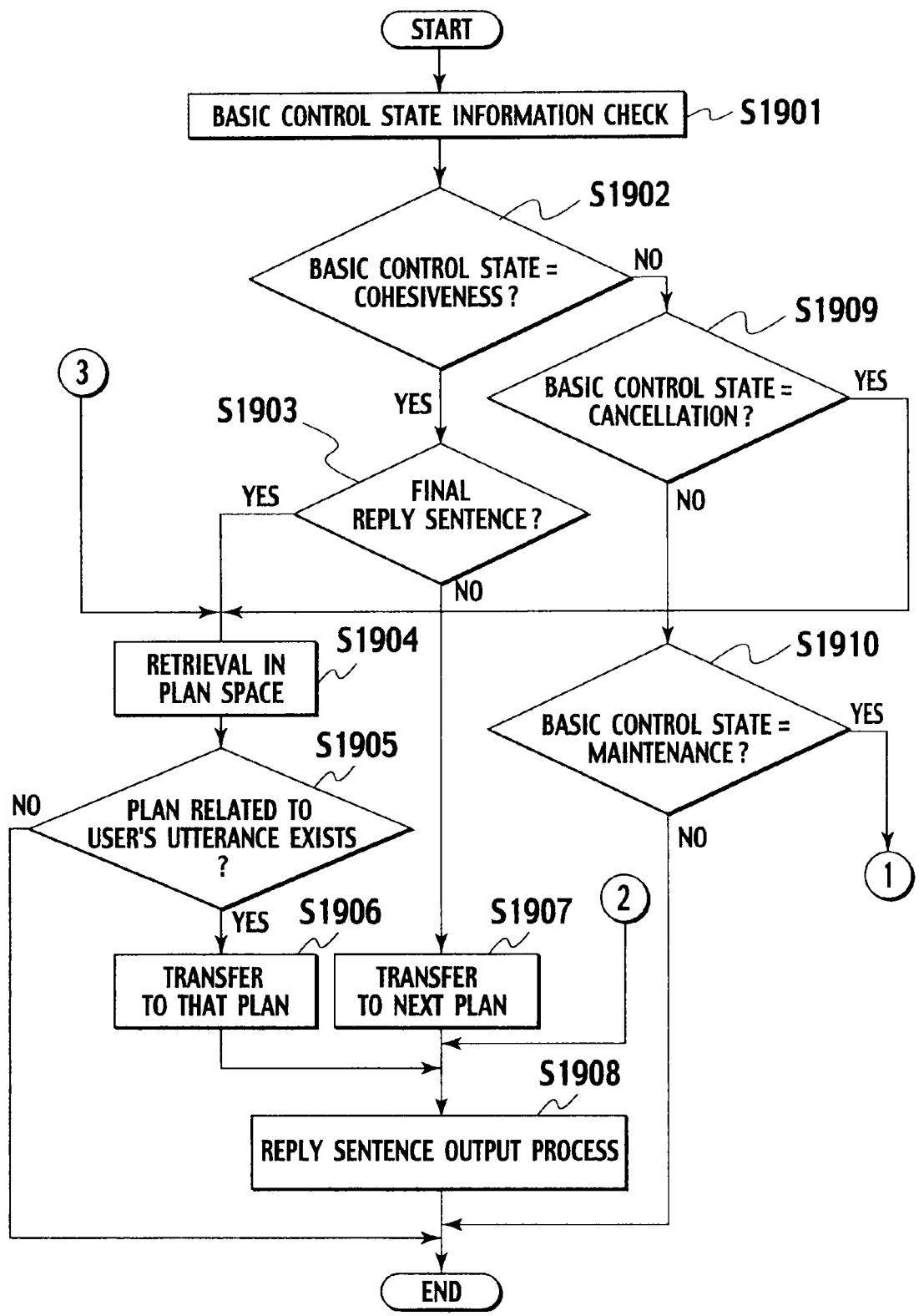
FIG. 39 is a flow chart showing a plan conversation control process.
Figure 40:
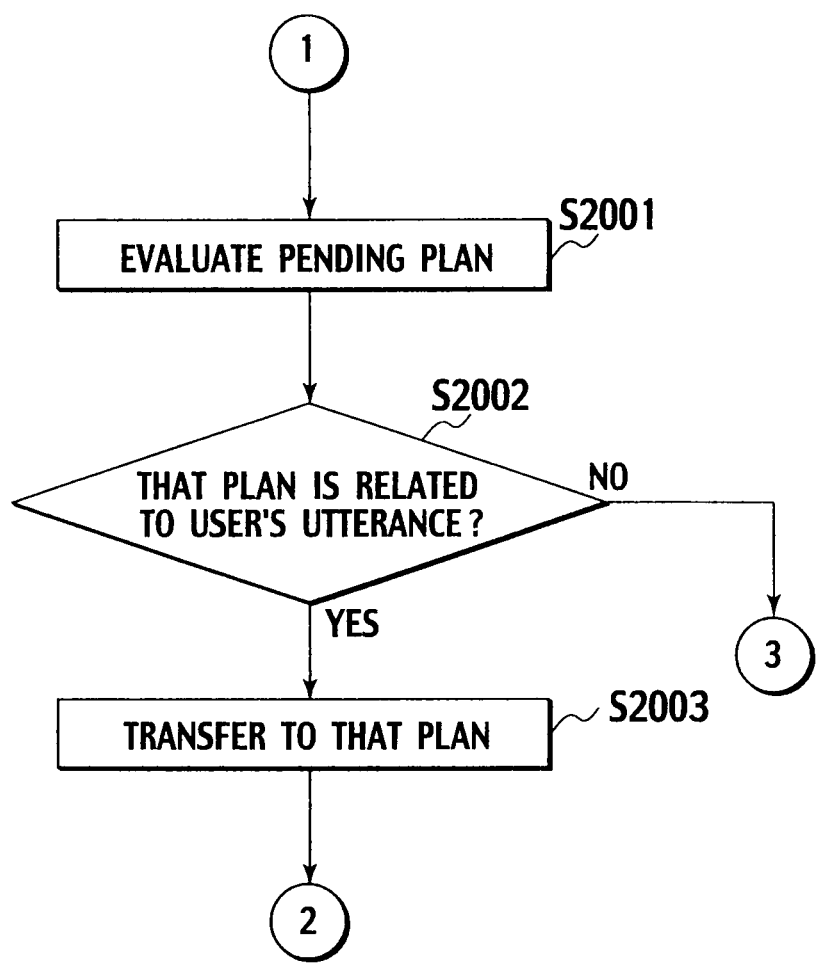
FIG. 40 is a flow chart, continued from FIG. 39, showing the rest of the plan conversation control process.

FIGS. 39 and 40 are flow charts showing an example of the plan conversation control process. Hereinbelow, the example of the plan conversation control process will be described with reference to FIGS. 39 and 40.

Upon executing the plan conversation control process, the plan conversation process unit 320 firstly executes a basic control state information check (S1901). The basic control state information is information on whether or not an execution(s) of a plan(s) has been completed and is stored in a predetermined memory area.

The basic control state information serves to indicate a basic control state of a plan.

Figure 41:
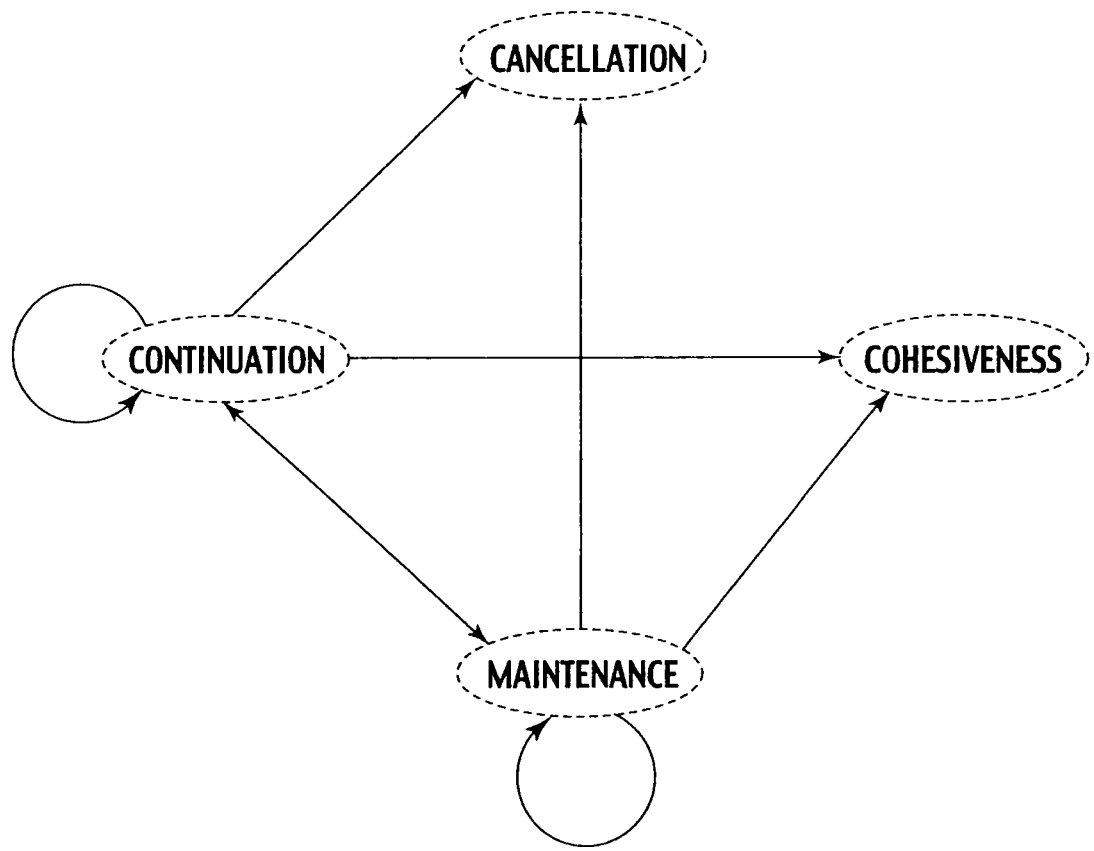
FIG. 41 is a transition diagram of a basic control state.

FIG. 41 is a diagram showing four basic control states which are possibly established due to a so-called scenario-type plan.

(1) Cohesiveness

This basic control state corresponds to a case where a user's utterance is coincident with the currently executed plan 1402, more specifically the topic title 820 or the example sentence 1701 associated with the plan 1402. In this case, the plan conversation process unit 320 terminates the plan 1402 and then transfers to another plan 1402 corresponding to the reply sentence 1501 designated by the next-plan designation information 1502.

(2) Cancellation

This basic control state is a basic control state which is set in a case where it is determined that user's utterance contents require a completion of a plan 1402 or that a user's interest has changed to another matter than the currently executed plan. When the basic control state indicates the cancellation, the plan conversation process unit 320 retrieves another plan 1402 associated with the user's utterance than the plan 1402 targeted as the cancellation. If the other plan 1402 exists, the plan conversation process unit 320 start to execute the other plan 1402. If the other plan 1402 does not exist, the plan conversation process unit 320 terminates an execution(s) of a plan(s).

(3) Maintenance

This basic control state is a basic control state which is set in a case where a user's utterance is not coincident with the topic title 820 (see FIG. 33) or the example sentence 1701 (see FIG. 37) associated with the currently executed plan 1402 and also the user's utterance does not correspond to the basic control state "cancellation".

In the case of this basic control state, the plan conversation process unit 320 firstly determines whether or not to resume a pending or pausing plan 1402 on receiving the user's utterance. If the user's utterance is not adapted for resuming the plan 1402, for example, in case where the user's utterance is not related to a topic title 820 or an example sentence 1701 associated with the plan 1402, the plan conversation process unit 320 starts to execute another plan 1402, an after-mentioned discourse space conversation control process (S1802) and so on. If the user's utterance is adapted for resuming the plan 1402, the plan conversation process unit 320 outputs a reply sentence 1501 based on the stored next-plan designation information 1502.

In case where the basic control state is the "maintenance", the plan conversation process unit 320 retrieves other plans 1402 in order to enable outputting another reply sentence than the reply sentence 1501 associated with the currently executed plan 1402, or executes the discourse space conversation control process. However, if the user's utterance is adapted for resuming the plan 1402, the plan conversation process unit 320 resumes the plan 1402.

(4) Continuation

This state is a basic control state which is set in a case where a user's utterance is not related to reply sentences 1501 included in the currently executed plan 1402, contents of the user's utterance do not correspond to the basic control sate "cancellation" and use's intention construed from the user's utterance is not clear.

In case where the basic control state is the "continuation", the plan conversation process unit 320 firstly determines whether or not to resume a pending or pausing plan 1402 on receiving the user's utterance. If the user's utterance is not adapted for resuming the plan 1402, the plan conversation process unit 320 executes an after-mentioned CA conversation control process in order to enable outputting a reply sentence for getting out a further user's utterance.

The plan conversation control process is further described with referring back to FIG. 39.

The plan conversation process unit 320, which has referred to the basic control state, determines whether or not the basic control state indicated by the basic control state information is the "cohesiveness" (S1902). If it has been determined that the basic control state is the "cohesiveness" (YES in S1902), the plan conversation process unit 320 determines whether or not the reply sentence 1501 is the final reply sentence in the currently executed plan 1402 (S1903).

If it has been determined that the final reply sentence 1501 has been output already (YES in S1903), the plan conversation process unit 320 retrieves another plan 1402 related to the use's utterance in the plan space in order to determine whether or not to execute the other plan 1402 (S1904) because the plan conversation process unit 320 has provided all contents to be replied to the user already. If the other plan 1402 related to the user's utterance has not been found due to this retrieval (NO in S1905), the plan conversation process unit 320 terminates the plan conversation control process because no plan 1402 to be provided to the user exists.

On the other hand, if the other plan 1402 related to the user's utterance has been found due to this retrieval (YES in S1905), the plan conversation process unit 320 transfers into the other plan 1402 (S1906). Since the other plan 1402 to be provided to the user still remains, an execution of the other plan 1402 (an output of the reply sentence 1501 included in the other plan 1402) is started.

Next, the plan conversation process unit 320 outputs the reply sentence 1501 included in that plan 1402 (S1908). The reply sentence 1501 is output as a reply to the user's utterance, so that the plan conversation process unit 320 provides information to be supplied to the user.

The plan conversation process unit 320 terminates the plan conversation control process after the reply sentence output process (S1908).

On the other hand, if the previously output reply sentence 1501 is not determined as the final reply sentence in the determination whether or not the previously output reply sentence 1501 is the final reply sentence (S1903), the plan conversation process unit 320 transfers into a plan 1402 associated with the reply sentence 1501 following the previously output reply sentence 1501, i.e. the specified reply sentence 1501 by the next-plan designation information 1502 (S1907).

Subsequently, the plan conversation process unit 320 outputs the reply sentence 1501 included in that plan 1402 to provide a reply to the user's utterance (s1908). The reply sentence 1501 is output as the reply to the user's utterance, so that the plan conversation process unit 320 provides information to be supplied to the user. The plan conversation process unit 320 terminates the plan conversation control process after the reply sentence output process (S1908).

Here, if the basic control state is not the "cohesiveness" in the determination process in S1902 (NO in S1902), the plan conversation process unit 320 determines whether or not the basic control state indicated by the basic control state information is the "cancellation" (S1909). If it has been determined that the basic control state is the "cancellation" (YES in S1909), the plan conversation process unit 320 retrieves another plan 1402 related to the use's utterance in the plan space 1401 in order to determine whether or not the other plan 1402 to be started newly exists (S1904) because a plan 1402 to be successively executed does not exist. Subsequently, the plan conversation process unit 320 executes the processes of S1905 to S1908 as well as the processes in case of the above-mentioned S1903 (YES).

On the other hand, if the basic control state is not the "cancellation" in the determination process in S1909 (NO in S1909) in the determination whether or not the basic control state indicated by the basic control state information is the "cancellation" (S1909), the plan conversation process unit 320 further determines whether or not the basic control state indicated by the basic control state information is the "maintenance" (S1910).

If the basic control state indicated by the basic control state information is the "maintenance" (YES in S1910), the plan conversation process unit 320 determined whether or not the user presents the interest on the pending or pausing plan 1402 again and then resumes the pending or pausing plan 1402 in case where the interest is presented (FIG. 40; S2001). In other words, the plan conversation process unit 320 evaluates the pending or pausing plan 1402 (FIG. 40; S2001) and then determines whether or not the user's utterance is related to the pending or pausing plan 1402 (S2002).

If it has been determined that the user's utterance is related to that plan 1402 (YES in S2002), the plan conversation process unit 320 transfers into the plan 1402 related to the user's utterance (S2003) and then executes the reply sentence output process (FIG. 39; S1908) to output the reply sentence 1501 included in the plan 1402. Operating in this manner, the plan conversation process unit 320 can resume the pending or pausing plan 1402 according to the user's utterance, so that all contents included in the previously prepared plan 1402 can be provided to the user.

On the other hand, if it has been determined that the user's utterance is not related to that plan 1402 (NO in S2002) in the above-mentioned S2002 (see FIG. 40), the plan conversation process unit 320 retrieves another plan 1402 related to the use's utterance in the plan space 1401 in order to determine whether or not the other plan 1402 to be started newly exists (FIG. 39; S1904). Subsequently, the plan conversation process unit 320 executes the processes of S1905 to S1908 as well as the processes in case of the above-mentioned S1903 (YES).

If it is determined that the basic control state indicated by the basic control state information is not the "maintenance" (NO in S1910) in the determination in step S1910, it means that the basic control state indicated by the basic control state information is the "continuation". In this case, the plan conversation process unit 320 terminates the plan conversation control process without outputting a reply sentence.

With that, describing the plan control process has ended.

The main process is further described with referring back to FIG. 38.

The conversation control unit 300 executes the discourse space conversation control process (S1802) after the plan conversation control process (S1801) has been completed. Note that, if the reply sentence has been output in the plan conversation control process (S1801), the conversation control unit 300 executes a basic control information update process (S1804) without executing the discourse space conversation control process (S1802) and the after-mentioned CA conversation control process (S1803) and then terminates the main process.

Figure 42:
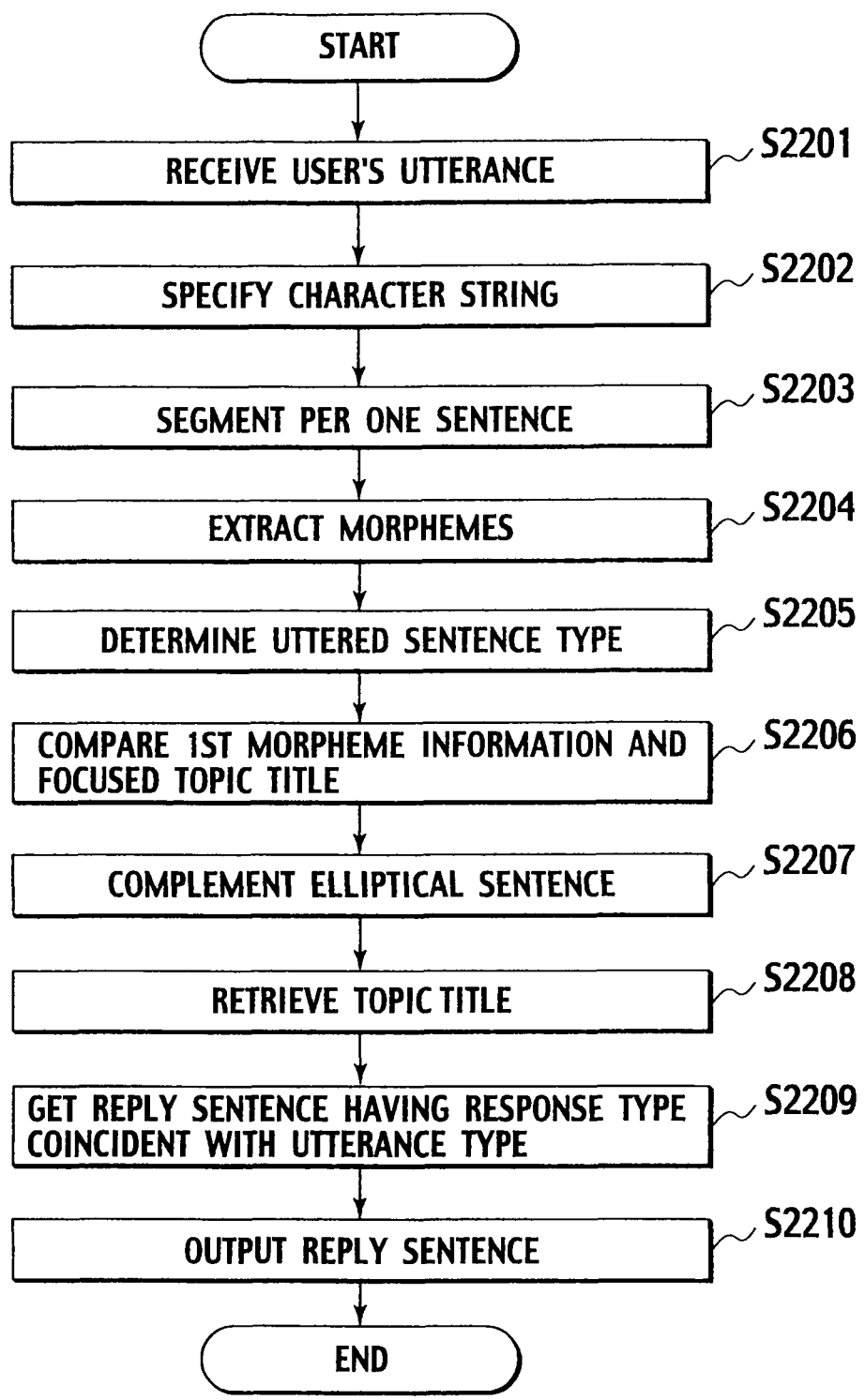
FIG. 42 is a flow chart showing a discourse space conversation control process.

FIG. 42 is a flow chart showing an example of a discourse space conversation control process according to the present embodiment.

The input unit 100 firstly executes a step for receiving a user's utterance (step S2201). Specifically, the input unit 100 receives voice sounds of the user's utterance. The input unit 100 outputs the received voice sounds to the speech recognition unit 200 as a voice signal. Note that the input unit 100 may receive a character string input by a user (for example, text data input in a text format) instead of the voice sounds. In this case, the input unit 100 may be a text input device such as a keyboard or a touchscreen.

Next, the speech recognition unit 200 executes a step for specifying a character string corresponding to the uttered contents based on the uttered contents retrieved by the input unit 100 (step S2202). Specifically, the speech recognition unit 1200, which has received the voice signal from the input unit 100, specifies a word hypothesis (candidate) corresponding to the voice signal based on the received voice signal. The speech recognition unit 200 retrieves a character string corresponding to the specified word hypothesis and outputs the retrieved character string to the conversation control unit 300, more specifically the discourse space conversation control process unit 330, as a character string signal.

And then, the character string specifying unit 410 segments a series of the character strings specified by the speech recognition unit 200 into segments (step S2203). Specifically, if the series of the character strings have a time interval more than a certain interval, the character string specifying unit 410, which has received the character string signal or a morpheme signal from the managing unit 310, segments the character strings there. The character string specifying unit 410 outputs the segmented character strings to the morpheme extracting unit 420 and the input type determining unit 440. Note that it is preferred that the character string specifying unit 410 segments a character string at a punctuation, a space and so on in a case where the character string has been input from a keyboard.

Subsequently, the morpheme extracting unit 420 executes a step for extracting morphemes constituting minimum units of the character string as first morpheme information based on the character string specified by the character string specifying unit 410 (step S2204). Specifically, the morpheme extracting unit 420, which has received the character strings from the character string specifying unit 410, compares the received character strings and morpheme groups previously stored in the morpheme database 430. Note that, in the present embodiment, each of the morpheme groups is prepared as a morpheme dictionary in which a direction word, a reading, a word class and an inflected forms are described for each morpheme belonging to each word-class classification.

The morpheme extracting unit 420, which has executed the comparison, extracts coincident morphemes (m1, m2, . . . ) with the morphemes included in the previously stored morpheme groups from the received character string. The morpheme extracting unit 420 outputs the extracted morphemes to the topic specification information retrieval unit 350 as the first morpheme information.

Next, the input type determining unit 440 executes a step for determining the "uttered sentence type" based on the morphemes which constitute one sentence and are specified by the character string specifying unit 410 (step S2205). Specifically, the input type determining unit 440, which has received the character strings from the character string specifying unit 410, compares the received character strings and the dictionaries stored in the utterance type database 450 based on the received character strings and extracts elements relevant to the dictionaries among the character strings. The input type determining unit 440, which has extracted the elements, determines to which "uttered sentence type" the extracted element(s) belongs based on the extracted element(s). The input type determining unit 440 outputs the determined "uttered sentence type" (utterance type) to the reply retrieval unit 380.

And then, the topic specification information retrieval unit 350 executes a step for comparing the first morpheme information extracted by the morpheme extracting unit 420 and the focused topic title $820_{focus}$ (step S2206).

If a morpheme in the first morpheme information is related to the focused topic title $820_{focus}$, the topic specification information retrieval unit 350 outputs the focused topic title $820_{focus}$ to the reply retrieval unit 380. On the other hand, if no morpheme in the first morpheme information is related to the focused topic title $820_{focus}$, the topic specification information retrieval unit 350 outputs the received first morpheme information and the user input sentence topic specification information to the elliptical sentence complementation unit 360 as the retrieval command signal.

Subsequently, the elliptical sentence complementation unit 360 executes a step for including the focused topic specification information and the reply sentence topic specification information into the received first morpheme information based on the first morpheme information received from the topic specification information retrieval unit 350 (step S2207). Specifically, if it is assumed that the first morpheme information is defined as "W" and a set of the focused topic specification information and the reply sentence topic specification information is defined as "D", the elliptical sentence complementation unit 360 generates the complemented first morpheme information by including an element(s) in the set "D" into the first morpheme information "W" and compares the complemented first morpheme information and all the topic titles 820 to retrieve the topic title 820 related to the complemented first morpheme information. If the topic title 820 related to the complemented first morpheme information has been found, the elliptical sentence complementation unit 360 outputs the topic title 820 to the reply retrieval unit 380. On the other hand, if no topic title 820 related to the complemented first morpheme information has been found, the elliptical sentence complementation unit 360 outputs the first morpheme information and the user input sentence topic specification information to the topic retrieval unit 370.

Next, the topic retrieval unit 370 executes a step for comparing the first morpheme information and the user input sentence topic specification information and retrieves the topic title 820 best-suited for the first morpheme information among the topic titles 820 (step S2208). Specifically, the topic retrieval unit 370, which has received the retrieval command signal from the elliptical sentence complementation unit 360, retrieves the topic title 820 best-suited for the first morpheme information among topic titles 820 associated with the user input sentence topic specification information based on the user input sentence topic specification information and the first morpheme information included in the received retrieval command signal. The topic retrieval unit 370 outputs the retrieved topic title 820 to the reply retrieval unit 380 as the retrieval result signal.

Next, the reply retrieval unit 380 compares, in order to select the reply sentence 830, the user's utterance type determined by the sentence analyzing unit 400 and the response type associated with the retrieved topic title 820 based on the retrieved topic title 820 by the topic specification information retrieval unit 350, the elliptical sentence complementation unit 360 or the topic retrieval unit 370 (step S2209).

The reply sentence 830 is selected in particular as described hereinbelow. Specifically, based on the "topic title" associated with the received retrieval result signal and the received "uttered sentence type", the reply retrieval unit 380, which has received the retrieval result signal from the topic retrieval unit 370 and the "uttered sentence type" from the input type determining unit 440, specifies one response type coincident with the "uttered sentence type" (for example, DA) among the response types associated with the "topic title".

Consequently, the reply retrieval unit 380 outputs the reply sentence 830 retrieved in step S2209 to the output unit 600 via the managing unit 310 (S2210). The output unit 600, which has received the reply sentence 830 from the managing unit 310, outputs the received reply sentence 830.

With that, describing the discourse space conversation control process has ended and the main process is further described with referring back to FIG. 38.

The conversation control unit 300 executes the CA conversation control process (S1803) after the discourse space conversation control process has been completed. Note that, if the reply sentence has been output in the plan conversation control process (S1801) or the discourse space conversation control (S1802), the conversation control unit 1300 executes the basic control information update process (S1804) without executing the CA conversation control process (S1803) and then terminates the main process.

The CA conversation control process (S1803) is a process in which it is determined whether a user's utterance is an utterance for "explaining something", an utterance for "confirming something", an utterance for "accusing or rebuking something" or an utterance for "other than these", and then a reply sentence is output according to the user's utterance contents and the determination result. By the CA conversation control process, a so-called "bridging" reply sentence for continuing the uninterrupted conversation with the user can be output even if a reply sentence suited for the user's utterance can not be output by the plan conversation control process nor the discourse space conversation control process.

Next, the conversation control unit 300 executes the basic control information update process (S1804). In this process, the conversation control unit 300, more specifically the managing unit 310, sets the basic control information to the "cohesiveness" when the plan conversation process unit 320 has output a reply sentence, sets the basic control information to the "cancellation" when the plan conversation process unit 320 has cancelled an output of a reply sentence, sets the basic control information to the "maintenance" when the discourse space conversation control process unit 330 has output a reply sentence, or sets the basic control information to the "continuation" when the CA conversation process unit 340 has output a reply sentence.

The basic control information set in this basic control information update process is referred in the above-mentioned plan conversation control process (S1801) to be employed for continuation or resumption of a plan.

As described the above, the reply process unit 21 can executes a previously prepared plan(s) or can adequately respond to a topic(s) which is not included in a plan(s) according to a user's utterance by executing the main process each time when receiving the user's utterance.

The configuration the reply process unit 21 as described above can be achieved by modifying any of the conversation controllers disclosed in US Patent Application Publications No. 2007/0094004, No. 2007/0094005, No. 2007/0094007, and No. 2007/0094008, which are incorporated by reference herein for all purposes.

What is claimed is:

1. A conversation scenario editing device for an automatic conversation system using a conversation scenario,
   the automatic conversation system including a conversation device and a conversation server,
   the conversation device for generating an input sentence through speech recognition of an utterance by a user and requesting the conversation server to send a reply sentence to the input sentence, and
   the conversation server for determining the reply sentence based on the conversation scenario when requested to send the determined reply sentence to the conversation device for an output of the reply sentence to the user,
   the conversation scenario editing device comprising:
   an editor configured to check whether or not an appropriate state transition relation is maintained in the conversation scenario edited thereby for editing the conversation scenario;
   a language model generator for calculating occurrence possibility of a word string of the input sentence within the conversation scenario edited by the editor and generating, based on a calculating results thereof, a language model to be used when the conversation device executes the speech recognition; and
   a timer to check a state where a predefined time period has elapsed without an utterance by the user,
   wherein the editor edits the conversation scenario to include a reply sentence corresponding to the state where a predefined time period has elapsed without an utterance by the user,
   wherein the reply sentence corresponding to the state where a predefined time period has elapsed without an utterance by the user is a suggestion for leading the user to select a route in the conversation scenario and
   wherein, in a case where a violation of the appropriate state transition relation occurs in the conversation scenario, the editor generates a message for notifying present of the violation and the input sentence or the reply sentence causing the violation to an operator and then displays the message on an output unit.

2. The conversation scenario editing device according to claim 1, wherein
   the conversation scenario includes an object and an morphism, and
   the conversation scenario editing device further comprises an editor for generating the conversation scenario in which the input sentence is the morphism and the reply sentence is the object that corresponds to the morphism.

3. The conversation scenario editing device according to claim 2, further comprises
   a dynamic knowledge generator for generating, from the conversation scenario, dynamic knowledge so as to search the object that corresponds to the morphism.

4. The conversation scenario editing device according to claim 1, wherein
   the editor also has a semantic interpretation dictionary, and has a function to rearrange or integrate redundant contents in the conversation scenario by using the semantic interpretation dictionary.

5. The conversation scenario editing device according to claim 1, wherein
   the conversation device includes an input unit for receiving contents of the user's utterance and converting them into audio signals, a speech recognition unit connected with the input unit, a conversation process unit connected with the speech recognition unit, an operation controller connected with the conversation process unit, and an output unit connected with the conversation process unit and the operation controller, wherein
   the speech recognition unit receives the language model generated by the language model generator and converts audio signals from the input unit into the input sentence based on the language model.

6. The conversation scenario editing device according to claim 5, wherein the speech recognition unit includes a preprocess unit that receives the audio signal, a feature extracting unit connected with the preprocess unit, and a specifying unit connected with the feature extracting unit 120, wherein
   the specifying unit includes a specification operation unit, an acoustic model memory connected with the specification operation unit, and a language model memory connected with the specification operation unit for storing the language model from the language model generator, wherein
   the content stored in the language model memory is rewritten by the language model from a language model generator.

7. An automatic conversation system comprising:
   a conversation device for generating an input sentence through speech recognition of an utterance by a user and for requesting a conversation server to send a reply sentence to the input sentence;
   the conversation server for determining the reply sentence based on a conversation scenario when being requested to send the determined reply sentence to the conversation device for an output of the reply sentence to the user; and
   a conversation scenario editing device that includes
   an editor configured to check whether or not an appropriate state transition relation is maintained in the conversation scenario edited thereby for editing the conversation scenario;
   a language model generator for calculating occurrence possibility of a word string of the input sentence included in the conversation scenario edited by the editor and generating, based on a calculating results thereof, a language model to be used when the conversation device executes the speech recognition; and
   a timer to check a state where a predefined time period has elapsed without an utterance by the user,
   wherein the editor edits the conversation scenario to include a reply sentence corresponding to the state where a predefined time period has elapsed without an utterance by the users,
   wherein the reply sentence corresponding to the state where a predefined time period has elapsed without an utterance by the user is a suggestion for leading the user to select a route in the conversation scenario and
   wherein, in a case where a violation of the appropriate state transition relation occurs in the conversation scenario, the editor generates a message for notifying present of the violation and the input sentence or the reply sentence causing the violation to an operator and then displays the message on an output unit.

8. The automatic conversation system according to claim 7, wherein
the conversation scenario includes an objects and morphisms, and
the system further comprises an editor for generating the conversation scenario in which the input sentence is the morphism and the reply sentence is the object that corresponds to the morphism.

9. The automatic conversation system according to claim 8, further comprises
a dynamic knowledge generator for generating, from the conversation scenario, dynamic knowledge so as to search the object that corresponds to the morphism.

10. The automatic conversation system according to claim 7, wherein
the conversation server is adapted to send, to the conversation device, operation control information in which an operation to be executed by the conversation device is described; and
the conversation device is adapted to execute the operation based on the operation control information along with the output of the reply sentence.

11. The automatic conversation system according to claim 10, wherein
the conversation device is a terminal device that is controlled based on the operation control information.

12. The automatic conversation system according to claim 7, wherein
the editor also has a semantic interpretation dictionary, and has a function to rearrange or integrate redundant contents in the conversation scenario by using the semantic interpretation dictionary.

13. The automatic conversation system according to claim 7, wherein
the conversation device includes an input unit for receiving contents of the user's utterance and converting them into audio signals, a speech recognition unit connected with the input unit, a conversation process unit connected with the speech recognition unit, an operation controller connected with the conversation process unit, and an output unit connected with the conversation process unit and the operation controller, wherein
the speech recognition unit receives the language model generated by the language model generator and converts audio signals from the input unit into the input sentence based on the language model.

14. The automatic conversation system according to claim 13, wherein
the speech recognition unit includes a preprocess unit that receives the audio signal, a feature extracting unit connected with the preprocess unit, and a specifying unit connected with the feature extracting unit 120, wherein
the specifying unit includes a specification operation unit, an acoustic model memory connected with the specification operation unit, and a language model memory connected with the specification operation unit for storing the language model from the language model generator, wherein
the content stored in the language model memory is rewritten by the language model from a language model generator.

* * * * *